(12) United States Patent
Sharma et al.

(10) Patent No.: US 12,487,922 B2
(45) Date of Patent: Dec. 2, 2025

(54) GARBAGE COLLECTION LIGHTWEIGHT DYNAMIC TRACING AND ANALYSIS

(71) Applicant: Microsoft Technology Licensing, LLC, Redmond, WA (US)

(72) Inventors: Mukund Raghav Sharma, San Diego, CA (US); Manish Godse, Sammamish, WA (US); Maoni Zhang Stephens, Kirkland, WA (US); Mark Ronald Plesko, Kirkland, WA (US); Ying Hung Au, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/640,804

(22) Filed: Apr. 19, 2024

(65) Prior Publication Data
US 2025/0328467 A1    Oct. 23, 2025

(51) Int. Cl.
*G06F 12/02*    (2006.01)
(52) U.S. Cl.
CPC .................. *G06F 12/0253* (2013.01)
(58) Field of Classification Search
CPC ................................................ G06F 12/0253
See application file for complete search history.

(56) References Cited

U.S. PATENT DOCUMENTS

| | | | |
|---|---|---|---|
| 11,954,023 B2 | 4/2024 | Stephens et al. | |
| 2014/0165204 A1* | 6/2014 | Williams | G06F 21/55 |
| | | | 726/25 |
| 2016/0098229 A1* | 4/2016 | Schreiber | G06F 3/0673 |
| | | | 711/166 |
| 2016/0239413 A1 | 8/2016 | Stephens et al. | |
| 2016/0306739 A1 | 10/2016 | Stephens et al. | |
| 2018/0143892 A1 | 5/2018 | Au et al. | |
| 2018/0217779 A1 | 8/2018 | Stephens et al. | |
| 2018/0217927 A1 | 8/2018 | Stephens et al. | |
| 2019/0384703 A1 | 12/2019 | Stephens et al. | |
| 2019/0384705 A1 | 12/2019 | Stephens et al. | |

(Continued)

OTHER PUBLICATIONS

"LLM01:2023—Prompt Injections", retrieved from << https://owasp.org/www-project-top-10-for-large-language-model-applications/Archive/0_1_vulns/Prompt_Injection.html >>, no later than Apr. 6, 2024, 1 page.

(Continued)

*Primary Examiner* — Aleksandr Kerzhner
*Assistant Examiner* — Aryan D Toughiry
(74) *Attorney, Agent, or Firm* — Wade IP Law PLLC

(57) ABSTRACT

Some embodiments perform lightweight monitoring for garbage collection (GC) flow events, then perform focused tracing after detecting a performance problem signal. The tracing is focused by constraints which are specified in a designation data structure, including a performance problem signal definition, a corresponding trace data category and a corresponding tracing stop trigger. Tracing is done only in the specified category and only for the specified time period, to reduce or avoid collection of irrelevant trace data and to reduce or avoid changes in program behavior caused by the tracing itself. Some designation data structures also specify a corresponding trace data analysis. In operation, some embodiments dynamically re-focus tracing on an offshoot trace in response to a trace data analysis result obtained while the program is still executing.

20 Claims, 4 Drawing Sheets

(56) References Cited

U.S. PATENT DOCUMENTS

| | | |
|---|---|---|
| 2020/0409839 A1 | 12/2020 | Stephens et al. |
| 2021/0191859 A1 | 6/2021 | Stephens et al. |
| 2021/0208954 A1 | 7/2021 | Stephens et al. |
| 2022/0114092 A1* | 4/2022 | Lengauer .............. G06F 12/023 |

OTHER PUBLICATIONS

"Prompt engineering", retrieved from << https://en.wikipedia.org/wiki/Prompt_engineering >>, Mar. 22, 2024, 16 pages.

"PerfView Tutorial", retrieved from << https://learn.microsoft.com/en-US/shows/perfview-tutorial/ >>, no later than Mar. 25, 2024, 8 pages.

"Maoni0/mem-doc", retrieved from << https://github.com/Maoni0/mem-doc/blob/master/doc/.NETMemoryPerformanceAnalysis.md >>, no later than Mar. 25, 2024, 85 pages.

"microsoft/semantic-kernel", retrieved from << https://github.com/microsoft/semantic-kernel >>, no later than Mar. 25, 2024, 7 pages.

"Garbage collection and performance", retrieved from << https://learn.microsoft.com/en-us/dotnet/standard/garbage-collection/performance >>, Jul. 12, 2022, 24 pages.

Warren, et al., "Runtime configuration options for garbage collection", Retrieved From: https://learn.microsoft.com/en-US/dotnet/core/runtime-config/garbage-collector, Nov. 11, 2023, 28 Pages.

"microsoft/perfview", retrieved from << https://github.com/microsoft/perfview/ >>, no later than Apr. 19, 2024, 7 pages.

\* cited by examiner

GARBAGE COLLECTION LIGHTWEIGHT DYNAMIC TRACING AND ANALYSIS

BACKGROUND

Computers include processors and memory. During the execution of a program by a processor, the program stores data in the memory, often in pieces in many individual data structures, some of which are used during only part of the program execution. A piece of allocated memory which was occupied by a data structure that is no longer needed by the program can be safely deallocated (a.k.a. freed or released) and put back into a pool of available memory. Freeing a piece of memory that is no longer in use allows that piece of memory to be safely reused later by the program.

Although some computing systems and programs free pieces of memory by making explicit calls in the program, in many systems and programs at least a part of the memory is managed automatically by a separate built-in functionality known as a "garbage collector". The garbage collector identifies pieces of memory allocated to data structures that are no longer needed by the program, and reclaims those pieces of memory for later use. Reliable and automatic collection of memory that would otherwise be wasted helps the program avoid running out of available memory during execution, helps improves program security by enforcing memory space access permissions, and helps improve developer productivity and reduce programming errors by letting developers focus on the program itself instead of managing the program's supporting infrastructure.

However, improvements in the way programs use garbage collection are still possible.

SUMMARY

Some embodiments address technical challenges arising from interactions between application programs and garbage collectors. One challenge is how to efficiently and accurately identify possible causes of application program performance problems that involve garbage collection. Another challenge is how to obtain sufficient trace data to diagnose a program's performance problem without obscuring or compounding performance problem causes by changing the program's performance in order to obtain the trace data. Another challenge is determining when and how to adapt trace data collection to a program's behavior while the program is executing. Other technical challenges are also addressed herein.

Some embodiments taught herein provide or utilize garbage collection analysis functionality which gets a "garbage collection end" (e.g., GCEnd) or other GC flow event via lightweight monitoring while a program is running, detects a performance problem signal in performance data gathered by the lightweight monitoring, conducts a constrained trace by enabling collection of a specified category of trace data until a specified stop trigger occurs, the category and the stop trigger each corresponding to the problem signal, and submits the trace data to a specified analysis that also corresponds to the problem signal. The lightweight nature of the monitoring, the time window boundaries of problem signal detection and stop trigger occurrence, and the limitation of trace data to the specified category, operate individually and together as constraints that reduce computational resource usage, reduce the risk of obscuring or compounding performance problem causes by excessive tracing, and dynamically adapt trace data collection to the program's behavior while the program is executing.

Other technical activities, technical characteristics, and technical benefits pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
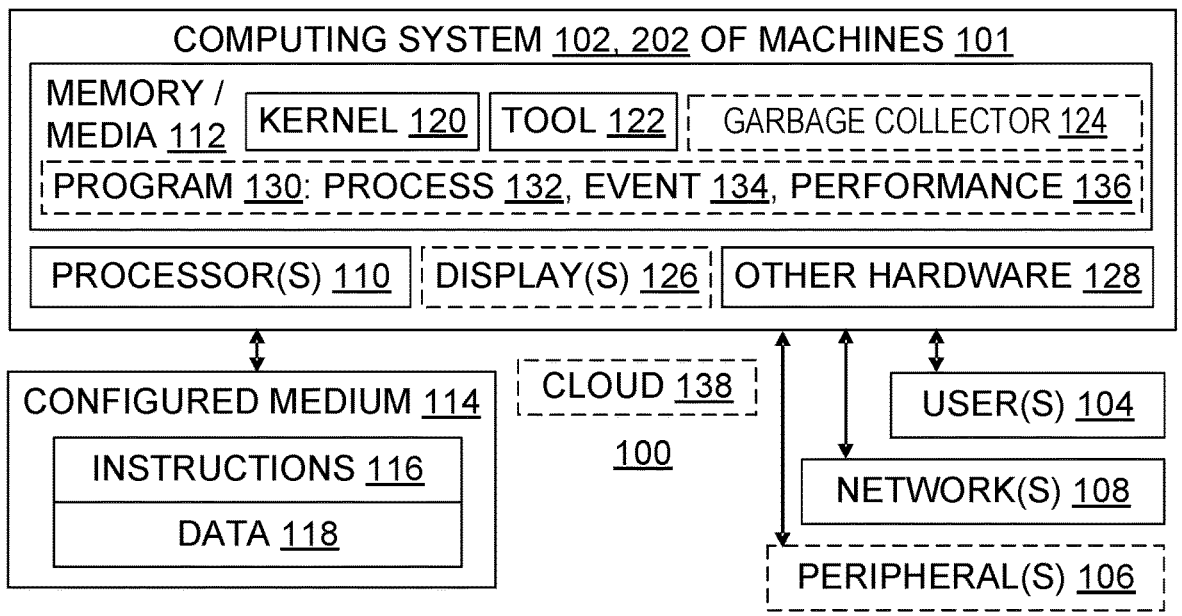
FIG. 1 is a diagram illustrating aspects of computer systems and also illustrating configured storage media, including some aspects generally suitable for embodiments which include or use garbage collection analysis via designation constrained tracing (GCADCT) functionality.

Applications often use managed memory, that is, computer system memory whose reclamation is managed by a garbage collector. Some teachings described herein were motivated by technical challenges faced and insights gained during efforts to improve technology for the investigation and mitigation of software application performance problems that involve garbage collection (GC). These challenges and insights provided some motivations, but the teachings herein are not limited in their scope or applicability to these particular tools, motivational challenges, solutions, or insights.

Sometimes the performance of an application program that uses managed memory can be improved by implementing optimizations which are identified by an investigation of how the program interacts with the garbage collector. However, garbage collection is both a non-trivial mechanism and a mechanism whose nuances are not familiar to many of the developers whose programs use managed memory. Many developers do not know what type of data to examine and what signals to look for as indications of an underlying problem. This is due to the specialized nature of garbage collection, as well as the efficiency of most garbage collector—application program combinations in practice, not to any developer flaw.

When a program's performance problem involves memory garbage collection, accurate and efficient diagnosis of the problem depends on capturing and analyzing the correct kind of tracing data. A brute force approach, also referred to as "exhaustive tracing", would try to capture the important data by capturing every kind of trace data, for most or all of the program's execution. However, this is not practical or effective, because exhaustive tracing would likely change the behavior of the program which is being traced—processor cycles and memory will be consumed by the tracing, in addition to the program itself. I/O operations will also be performed more frequently, to store the traced event data. Exhaustive tracing would also consume computational resources unnecessarily, because most of the resulting trace data would not be useful for diagnosing performance problems (other than serving as evidence of a different problem—performance loss caused by excessive tracing).

Some embodiments taught herein provide a different approach, which uses a designation set data structure containing one or more designation data structures. Each designation specifies a performance problem signal, a trace data category, and a stop trigger. In some variations, the designation also specifies a trace data analysis.

Some embodiments monitor an executing program for the performance problem signal. In some embodiments, this is a lightweight monitoring that protects data privacy and does not substantially alter program behavior, unlike exhaustive tracing. When the performance problem signal for a particular designation is detected, designation-constrained tracing is enabled to collect trace data in the designation's trace data category until the designation's stop trigger occurs. The resulting trace data is analyzed to identify a cause of the performance problem.

The designation-constrained tracing is thus performed at a point in the program execution that implicates the particular performance problem, instead of during large parts of the execution that have no such performance problem. The designation-constrained trace is limited to collecting trace data that is relevant to the particular performance problem, because it is limited both in the category of data collected and in the time period of data collection. This designation-constrained tracing has the technical benefits of conserving computational resources, and facilitating performance problem diagnosis by not embedding relevant trace data in a flood of extraneous trace data.

Some embodiments described herein use or provide a garbage collection analysis method performed in a computing system. The computing system is configured with a designation data structure which designates an analysis as corresponding to a performance problem signal. The GC analysis method includes: getting an event indicating that a garbage collection has ended; comparing performance data of the garbage collection to the performance problem signal; detecting in the performance data an instance of the performance problem signal; identifying a data category and selecting a stop trigger, the data category and the stop trigger each designated in the computing system as corresponding to the performance problem signal; conducting a designation-constrained tracing of the process, including changing a trace data collection status 1108 by enabling collecting of trace data in the data category, collecting the trace data, and then in response to the stop trigger changing the trace data collection status by disabling collecting of trace data in the data category; and submitting the trace data to the analysis.

In short, in some embodiments a designation data structure and an embodiment's operational usage of that data structure place (a) a performance problem signal, (b) a trace data category, (c) a tracing stop trigger, and (d) a trace data analysis into a correspondence with one another as parts of the same designation data structure. This allows the embodiment to collect the relevant kind of trace data for the signal, in the relevant category and for the relevant time period, and then analyze the collected trace data using the relevant analysis, in order to help diagnose a cause of the underlying problem that is indicated by the problem signal.

This GCADCT functionality has the technical benefit of controlling the internal function or operation of a computing system by balancing a processor load between the application program and the application program tracer during an investigation of a performance problem. By contrast, exhaustive tracing does a poor job of balancing the program's execution against the tracer's execution because the program is denied processor cycles which are consumed instead by the tracer, even though the resulting trace is excessive, and even when the lack of program access to the processor worsens the program's performance.

This GCADCT functionality also has the technical benefit of efficiently processing the program's code at a low level by emitting trace data only for the program run time events and program data structures which correspond to the designated problem signal, which also correspond to the designated trace data category, and which also correspond to the designated stop trigger. This event-level processing contributes to producing the technical result of limiting the computational resources needed for a particular performance problem analysis.

This GCADCT functionality also has the technical benefit of improving program security by aiding identification of unexpected garbage collection activity. Unexpected or unexplained garbage collection activity is sometimes an indication or a result of unplanned activity, interference, or injected malicious activity in the execution of an application program. Deviations from the program's expected execution flow poses a security risk.

In some embodiments, the method includes obtaining a result of the analysis; and in response to the result of the analysis, conducting an offshoot tracing of the process. The offshoot trace differs from the designation-constrained trace with respect to at least one of: the data category or the stop trigger. The offshoot trace operates in a feedback loop to adapt tracing dynamically while the program with the performance problem is still executing.

For example, in one scenario a first problem signal indicates along GC pause time is reducing program performance. Corresponding trace data (processor stack data) is collected and analyzed in a processor stacks and GC pause duration analysis. The analysis results include an indication that one or more calls were made to induce garbage collection. In response to this result, the embodiment conducts an offshoot trace which gathers trigger stack data (a different data category than processor stack data) until an induced GC stop trigger (a different stop trigger than the GC pause duration stop trigger), and then performs an induced GC and trigger stacks analysis. In this example, both the initial GC pause time trace and analysis and the offshoot induced GC trace and analysis are performed during the same execution of the program. As a result, excessive induced GCs is identified as a cause of the program's poor performance.

This GCADCT functionality has the technical benefit of dynamically adapting event-level trace collection activities, resulting in the capture of relevant trace data that otherwise would either remain uncollected (only irrelevant data is collected) or be obscured in irrelevant data (e.g., due to exhaustive tracing). This tight focus on current and relevant trace data facilitates the identification of causes behind program performance problems.

In some embodiments, the method includes obtaining a result of the analysis; and in response to the result of the analysis, generating and presenting a human-readable recommendation for mitigating a performance problem which corresponds to the performance problem signal. For example, in one scenario an induced GCs analysis aggregates the GC trigger stacks for induced GCs, resulting in an identification of a call stack that's explicitly calling a GC induction routine. The embodiment then generates and displays a recommendation along the lines of "To improve program performance, reduce or eliminate calls to the garbage collection call "GC.Collect"in the call stack shown below."

This GCADCT functionality has the technical benefit of conserving computational resources and improving developer productivity by avoiding investigative steps that focus on the wrong trace data, and avoiding investigative steps that rely on a misunderstanding of how garbage collectors and application programs operate and interact.

In some embodiments, prior to getting the event indicating that the garbage collection of the process has ended, garbage collection flow events are the only events of the process which are traced. This GCADCT functionality has the technical benefit of detecting performance problem signals using lightweight monitoring. The monitoring in this example is considered lightweight because the monitor only subscribes to GC flow events. Unlike CPU monitoring, monitoring for the GC flow events doesn't encompass obtaining any other data, such as module names, call stacks, or user functions. Accordingly, privacy is protected because data containing private information is not placed in the GC performance data, unless and until an actual performance problem signal is detected.

In some embodiments, while conducting the designation-constrained tracing of the process, trace data in the specified data category is the only data of the process which is traced. This GCADCT functionality has the technical benefit of reducing the amount of trace data to be analyzed, without excluding trace data that is relevant to the specific problem being investigated. This distinguishes the designation-constrained trace from an exhaustive trace.

In some embodiments, the GC flow event-getting step through the data category-identifying step consume a first amount of a computational resource during a portion of the program's execution, whereas performing a full tracing (a.k.a. exhaustive tracing in all trace data categories) during a corresponding portion of a second execution of the program consumes a second amount of the computational resource. In some cases, the first amount is no more than N percent of the second amount, where N is one of 30, 40, 50, or 60, and the computational resource includes at least one of: processor cycles, or memory space. This set of examples illustrates the GCADCT functionality technical benefit of tracing which is constrained according to the designated problem signal, data category, and stop trigger. Such designation-constrained tracing reduces the amount of trace data to analyze, relative to full tracing, without excluding trace data that is relevant to the specific problem being investigated.

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 138. An individual machine is a computer system, and a network or other non-empty group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

The distinction between human-driven accounts and machine-driven accounts is a different distinction than the distinction between attacker-driven accounts and non-attacker driven accounts. A particular human-driven account may be attacker-driven, or non-attacker-driven, at a given point in time. Similarly, a particular machine-driven account may be attacker-driven, or non-attacker-driven, at a given point in time.

Although for convenience, examples and claims herein sometimes speak in terms of accounts, "account" means "account or session or both" unless stated otherwise. In this disclosure, including in the claims and elsewhere, a statement about activity by "the user account or the user session" does not mean that both the user account and the user session must be present. Instead, such a statement is to be understood as a pair of corresponding but distinct statements given as alternatives, one statement being about activity by the user account, and the other statement being about activity by the user session. Likewise, a characterization of "the user account or the user session" does not mean that both the user account and the user session must be present. Instead, such a characterization is to be understood as a pair of corresponding but distinct characterizations given as alternatives, one characterizing the user account, and the other characterizing the user session.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 138 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security 1168 tools or software applications, mobile devices 102 or workstations 102 or servers 102, editors, compilers, debuggers and other software development tools, as well as APIs, browsers, or webpages and the corresponding software for protocols such as HTTPS, for example. Files, APIs, endpoints, and some other resources 334 may be accessed by an account or non-empty set of accounts, user or non-empty group of users, IP address or non-empty group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components, Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, GCADCT functionality 204 could be installed on an air gapped network 108 and then be updated periodically or on occasion using removable media 114, or not be updated at all. Some embodiments also communicate technical data or technical instructions or both through direct memory access, removable or non-removable volatile or nonvolatile storage media, or other information storage-retrieval and/or transmission approaches.

In this disclosure, "semantic" refers to text or program or program construct meaning, as exemplified, represented, or implemented in digital artifacts such as vectors, or in program aspects such as data types, data flow, resource usage during execution, and other operational characteristics. In contrast, "syntactic" refers to whether a string of characters is valid according to a programming language definition or program input specification.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems 102, functionalities, mechanisms, devices, data structures 324, kinds of data 118, settings, parameters, components, computational resources 334 (e.g., processor cycles, memory space, network bandwidth, electrical power), programming languages, tools 122, workflows, or algorithm implementations, or other items in a computing environment, which are disclosed herein but not associated with a particular reference numeral herein. Corresponding drawings may also be added.

More About Systems

Figure 2:
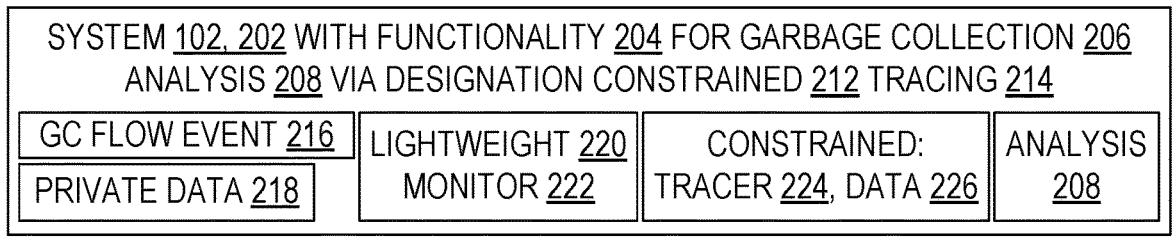
FIG. 2 is a block diagram illustrating aspects of a family of enhanced systems which are each configured with GCADCT functionality.

FIG. 2 illustrates a computing system 102 configured by some of the GCADCT functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items ("items" are designated with nouns or verbs) are discussed at various points herein.

Figure 3:
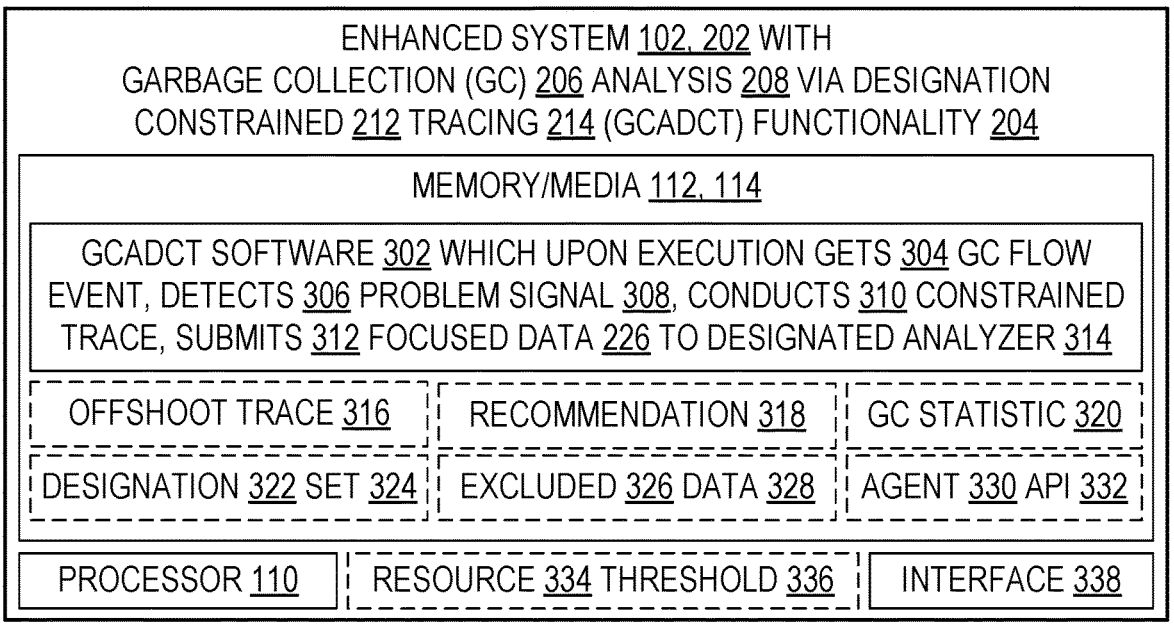
FIG. 3 is a block diagram illustrating aspects of another family of systems which are each enhanced GCADCT functionality, including some systems with software which upon execution performs a first family of GCADCT methods.

FIG. 3 shows some aspects of some enhanced systems 202. Like FIG. 2, FIG. 3 is not a comprehensive summary of all aspects of enhanced systems 202 or all aspects of GCADCT functionality 204. Nor is either figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein.

Figure 4:
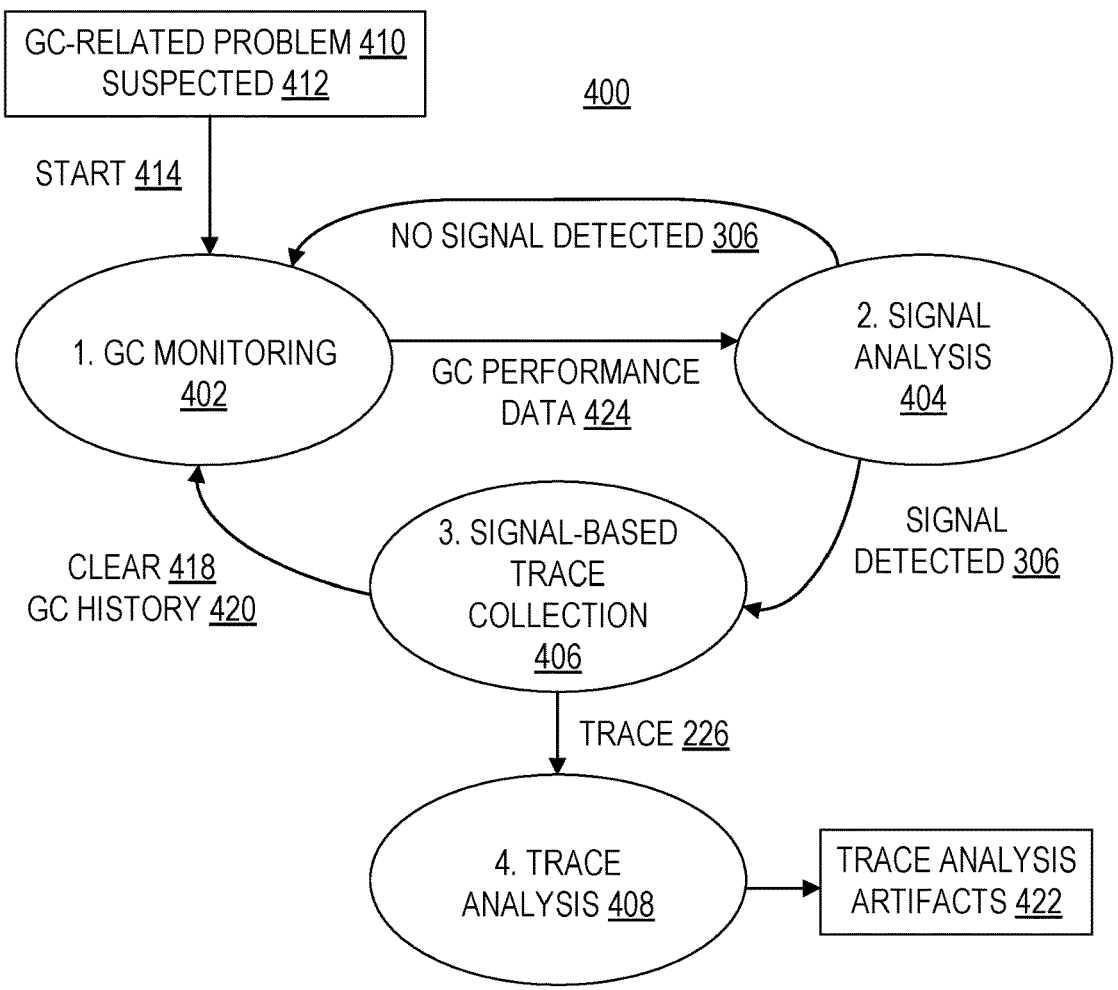
FIG. 4 is a state transition diagram illustrating a second family of GCADCT methods.
Figure 5:
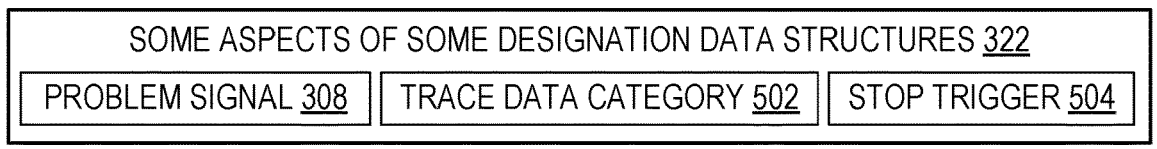
FIG. 5 is a block diagram illustrating some aspects of designation data structures in GCADCT functionality.
Figure 6:
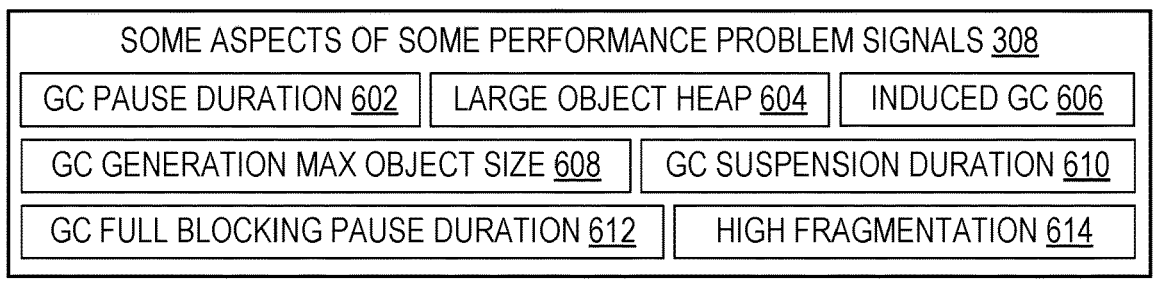
FIG. 6 is a block diagram illustrating some aspects of performance problem signals in GCADCT functionality.
Figure 7:
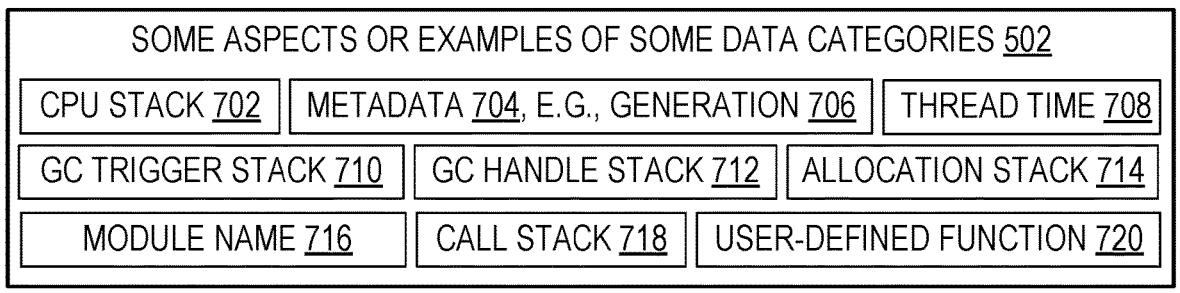
FIG. 7 is a block diagram illustrating some aspects or examples of trace data categories in GCADCT functionality.
Figure 8:
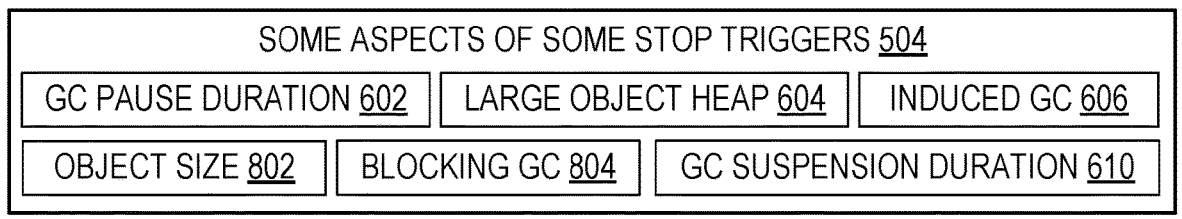
FIG. 8 is a block diagram illustrating some aspects of tracing stop triggers in GCADCT functionality.
Figure 9:
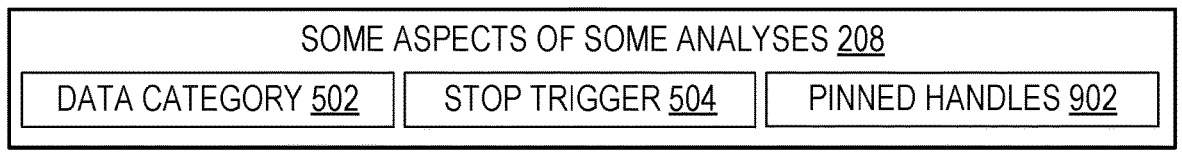
FIG. 9 is a block diagram illustrating some aspects of trace data analysis in GCADCT functionality.

FIG. 4 shows a state transition diagram 400 of a computing system architecture. This is not a comprehensive summary of all aspects of GCADCT architectures or a requirement for any particular architecture or portion of an architecture. FIG. 4 items are discussed at various points herein.

FIGS. 5, 6, 7, 8, and 9 shows some additional aspects of GCADCT functionality 204, with a respective focus on designation data structure 322, performance problem signals 308, trace data categories 502, trace stop triggers 504, and trace data analyses 208. These are not individually or collectively not a comprehensive summary of all aspects or focal areas of enhanced systems 202 or all aspects of GCADCT functionality 204. FIGS. 5, 6, 7, 8, and 9 items are discussed at various points herein.

Figure 10:
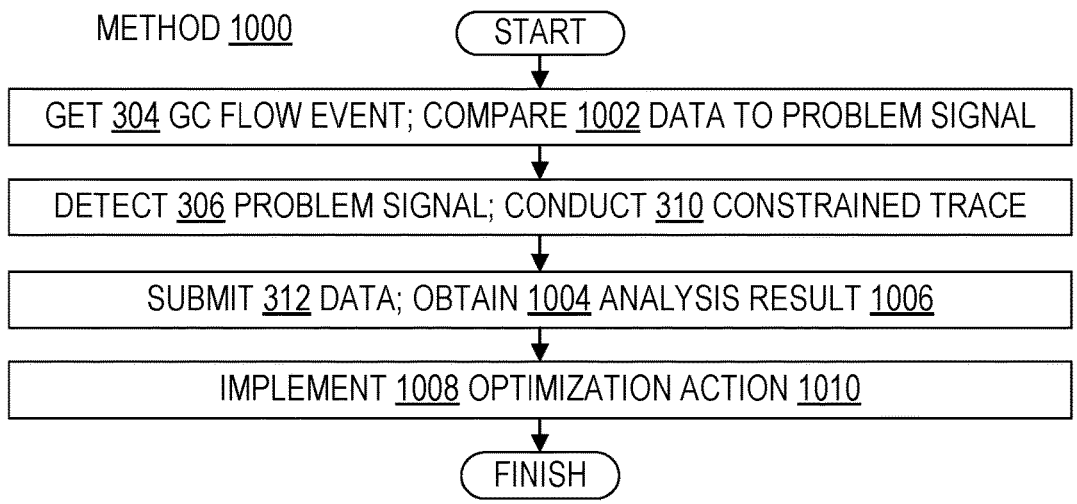
FIG. 10 is a flowchart illustrating a third family of GCADCT methods.
Figure 11:
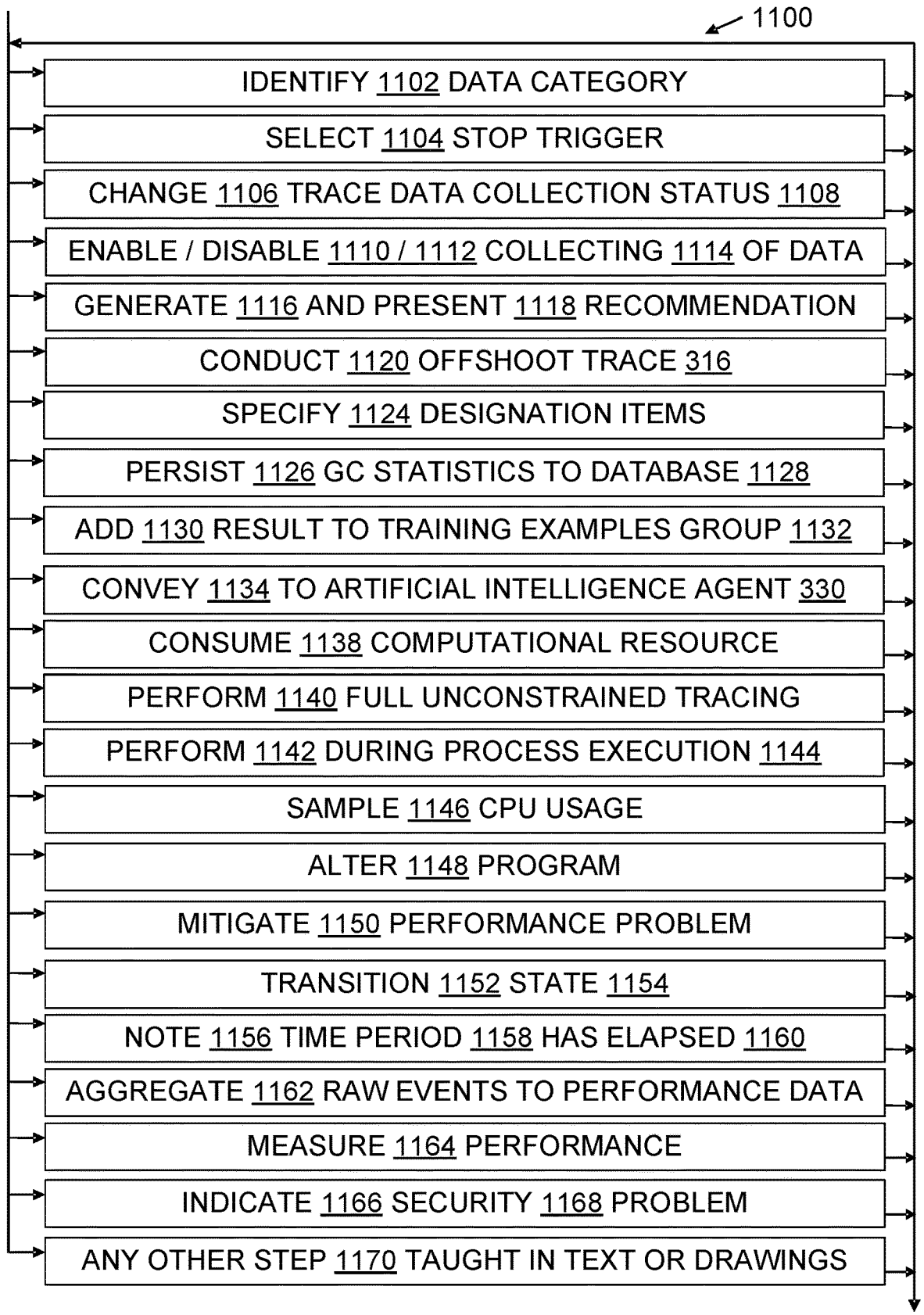
FIG. 11 is a flowchart further illustrating GCADCT methods, and incorporating as options the steps illustrated in FIGS. 2, 3, 4, and 10.

The other figures are also relevant to systems 202. FIGS. 10 and 11 are flowcharts which illustrate some methods of GCADCT functionality 204 operation in some systems 202.

In some embodiments, an enhanced computer 202 monitors itself, takes a focused trace of a program process that is executing on itself, submits that trace to an analyzer running on itself, and performs an optimization action 1010 on itself based at least in part on a result of the analyzer's analysis 208. However, these various computational activities 1100 and corresponding data structures can also be divided, or spread between multiple computers 102 or other devices 101. In some embodiments, one computer monitors another computer and the monitored computer's activity is traced; the trace is analyzed on the monitoring computer in some embodiments, and the trace is analyzed on a third computer in other embodiments.

Unless stated otherwise, GCADCT functionality 204 resides on, and is performed on, a computing system not a particular computer 101. Although a computing system may consist of a single machine, a "computing system" is not inherently restricted to a single machine. One of skill will understand that messages, APIs, networks, busses, shared memory, and other communication mechanisms are used between machines 101 in some embodiments when exercising GCADCT functionality 204. Different steps of a garbage collection analysis method 1100 are sometimes performed on different machines within a single overall computing system 202, or performed with data 118 of different machines of a particular computing system 202.

In some embodiments, the enhanced system 202 is networked through an interface 338. In some, an interface 338 includes hardware such as network interface cards, software such as network stacks, APIs, or sockets, combination items such as network connections, or a combination thereof.

Some embodiments include a computing system 202 which is configured to utilize or provide GCADCT functionality 204, e.g., configured for garbage collection (GC) analysis 208. The GC analysis in some scenarios is or includes a garbage collection analysis, a performance analysis, or both. It is analogous in some scenarios to a static analysis of code, except the subject of the GC analysis is primarily the constrained trace 226 created by execution of an executable version of source code as opposed to being the source code itself. The system 202 includes a digital memory set 112 including at least one digital memory 112, and a processor set 110 including at least one processor 110. The processor set is in operable communication with the digital memory set. A digital memory set is a set which includes at least one digital memory 112, also referred to as a memory 112. The word "digital" is used to emphasize that the memory 112 is part of a computing system 102, not a human person's memory. The word "set" is used to emphasize that the memory 112 is not necessarily in a single contiguous block or of a single kind, e.g., a memory 112 may include hard drive memory as well as volatile RAM, and may include memories that are physically located on different machines 101. Similarly, the phrase "processor set" is used to emphasize that a processor 110 is not necessarily confined to a single chip or a single machine 101. Sets are non-empty unless described otherwise.

In this example, the digital memory contains and thus is configured by a designation set data structure 324 residing in the at least one digital memory, the designation set data structure including a non-empty set of one or more designations 322, each designation specifying a performance problem signal 308, a corresponding trace data category 502, a corresponding trace stop trigger 504, and a corresponding analysis identifier or mechanism 208.

In this example, the at least one processor in operable communication with the at least one digital memory is configured to perform a computing system GC analysis 208 method 1100 during an execution 1144 of a process 132. The process 132 is part of a program 130 which includes one or more processes 132. This method 1100 includes (a) getting 304 an event 134 indicating that a garbage collection 206 of memory 112 of the process has ended, (b) comparing 1002 performance data 424 of the garbage collection to a particular designation in the set, (c) detecting 306 in the performance data an instance of the particular designation's performance problem signal, (d) conducting 310 a designation-constrained 212 tracing 214 of the process, including enabling 1110 collecting of trace data 226 in the particular designation's trace data category, collecting 1114 the trace data, and disabling 1112 collecting of trace data in the particular designation's data category in response to the particular designation's stop trigger, and (e) submitting 312 the trace data to the particular designation's analysis 208.

In some embodiments, the particular designation data structure 322 includes at least one of: a designation 322 specifying 1124 a garbage collection pause duration 602 performance problem signal 308, a processor stacks 702 data category 502, a garbage collection pause duration 602 stop trigger 504, and a processor stacks 702 and garbage collection pause duration 602 analysis 208 (see, e.g., "1. Unusually Long GC Pauses" elsewhere herein); or a designation 322 specifying 1124 a garbage collection suspension duration 610 performance 136 problem signal 308, a processor stacks 702 data category 502, a garbage collection suspension duration 610 stop trigger 504, and a processor stacks 702 and garbage collection suspension duration 610 analysis 208 (see, e.g., "6. Long Suspension" elsewhere herein).

Alternate phrasing of descriptions of designation data structures 322 is also contemplated herein and allowed. For instance, "a designation specifying a garbage collection pause duration performance problem signal, a processor stacks data category, a garbage collection pause duration stop trigger, and a processor stacks and garbage collection pause duration analysis" is functionally equivalent to "a designation including: a problem signal being a garbage collection pause duration, a trace data category which is 'processor stacks', a trace stop trigger being a garbage collection pause duration, and a type of garbage analysis being a garbage collection pause duration analysis". Similar alternate phrasing is contemplated and allowed for the descriptions of other examples herein of designation data structures 322.

In some embodiments, the particular designation data structure 322 includes at least one of: a designation 322 specifying a large object heap 604 garbage collection performance problem signal 308, a garbage collection trigger stacks 710 data category 502, a large object heap garbage collection stop trigger 504, and a large object heap garbage collection and garbage collection trigger stacks analysis (see, e.g., "2. Excessive Large Object Heap (LOH) Triggered Gen2s" elsewhere herein); or a designation 322 specifying a garbage collection generation maximum object size 608 performance problem signal 308, a garbage collection handle stacks 712 data category 502, a blocking garbage collection 804 and object size stop trigger 504, and a garbage collection handle stacks analysis 208 (see, e.g., "4. Gen0 Excessive Demotion" and also "5. High Gen2 Fragmentation" elsewhere herein).

In some embodiments, the particular designation data structure 322 includes at least one of: a designation 322 specifying a garbage collection full blocking pause duration 612 performance problem signal 308, a garbage collection trigger stacks 710 data category 502, an induced garbage collection 606 stop trigger 504, and a garbage collection trigger stacks analysis 208 (see, e.g., "7. Excessive Pauses Full Blocking GC (Induced)" elsewhere herein); a designation 322 specifying a garbage collection full blocking pause duration 612 performance problem signal 308, a garbage collection handle stacks 712 data category 502, an object size 802 stop trigger 504, and a garbage collection pinned handles 902 analysis 208 (see, e.g., "7. Excessive Pauses Full Blocking GC (Fragmented Gen2)" elsewhere herein); or a designation 322 specifying a garbage collection full blocking pause duration 612 performance problem signal 308, a processor stacks 702 data category 502, a garbage collection pause duration 602 stop trigger 504, and a garbage collection pause duration and processor stacks analysis 208 (see, e.g., "7. Excessive Pauses Full Blocking GC (Small Heap)" elsewhere herein).

In some embodiments, the particular designation data structure 322 specifies 1124 an induced garbage collection 606 performance problem signal 308, a garbage collection trigger stacks 710 data category 502, an induced garbage collection 606 stop trigger 504, and an induced garbage collection and garbage collection trigger stacks analysis 208 (see, e.g., "3. Excessive Induced GCs" elsewhere herein).

Some embodiments include N of the various designation data structure(s) 322 described herein, where N is in the range from 1 to 8, depending on the particular embodiment.

In some embodiments, a designation data structure 322 has the technical benefits of increasing developer productivity and conserving computational resources 334 that would otherwise be spent on misguided investigations of GC-related performance 136 problems. These benefits are accomplished by efficiently and effectively capturing 1114 trace data 226 that is relevant to a particular problem, while excluding 326 irrelevant data 328 from the trace 226.

In some embodiments, the analysis 208 of the trace data indicates 1166 a security violation 410 or a security vulnerability 410 in the computing system by aiding identification of unexpected garbage collection activity. For example, an unexpectedly high amount of garbage collection sometimes happens because unexpected processes are running, including unauthorized processes such as cryptocurrency mining processes, exfiltration processes, or ransomware encryption processes. More generally, deviations from a program's expected execution flow pose a security 1168 risk, and some deviations correlate with unexpected garbage collection activity.

Other system embodiments are also described herein, either directly or derivable as system versions of described processes or configured media, duly informed by the extensive discussion herein of computing hardware.

Although specific GCADCT architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of GCADCT functionality, for example, as well as different technical features, aspects, mechanisms, software, expressions, operational sequences, commands, data structures, programming environments, execution environments, environment or system characteristics, proxies, or other functionality consistent with teachings provided herein, and may otherwise depart from the particular examples provided.

State Transition Architectures

FIG. 4 illustrates an embodiment architecture 400 using an augmented state 1154 transition 1152 diagram, which is also referred to here by the reference numeral 400. State transition diagrams represent computing systems and their computational activities.

In the FIG. 4 example, a problem 410 that is potentially related to garbage collection 206 is suspected 412, e.g., when performance 136 falls short of target levels 336 for execution time (a proxy of processor usage), memory usage, bandwidth usage, electric power usage, or usage of one or more other computational resources 334. A system 202 proactively, or in response to a user command, starts 414 a garbage collection monitoring and analysis process 400, e.g., a subset of the family of methods 1100.

In some embodiments, architecture 400 performs lightweight 220 GC monitoring 402 of an application program process, which measures performance data of the GC and watches for (e.g., polls) or awaits (e.g., via an interrupt) an event 134 indicating that a garbage collection of the process has ended. Unlike exhaustive monitoring, in some embodiments the lightweight monitoring only monitors for GC flow events, not for other program-related events, e.g., I/O events, resource allocation/deallocation events, or process lifecycle events generally. On the process being monitored, it fires an event, and the event gets buffered somewhere. The other side which monitors the process gets notified whenever the buffer gets flushed.

In some embodiments and scenarios, a GC flow event 216 marks the end of a garbage collection. However, in some the GC flow event 216 marks a specified extent of completions, e.g., a GC flow event can be a 99% done event. In some scenarios, e.g., when a GC has mark and sweep phases, the GC flow event 216 corresponds to a mark start, a mark end, a sweep start, or a sweep end occurrence.

During an execution of the monitored process, the architecture 400 gets 304 an event indicating that a garbage collection of the process has ended, e.g., a GCEnd event 216, 134. Embodiment state 1154 then computationally transitions 1152 from State 1 (GC Monitoring State 402, 1154) to State 2 (Signal Analysis State 404, 1154). In State 2, the embodiment does a State 2 Signal Analysis by comparing performance data 424 of the garbage collection to a predefined (e.g., in a designation 322) performance problem signal definition 308. If no performance problem signal is detected 306, the embodiment transitions back to State 1.

If a performance problem signal 308 is detected 306, the embodiment transitions from State 2 (Signal Analysis) to State 3 (Signal Based Trace Collection State 406, 1154). In State 3, the embodiment identifies 1102 a data category and selects 1104 a stop trigger, e.g., by locating a designation 322 that corresponds to the detected performance problem signal and reading values, addresses, or other identifiers of the data category and the stop trigger from that designation 322.

The State 3 Trace Collection activity is thus Signal 308 Based. In State 3, the embodiment conducts 310 a focused tracing of the process, which is also referred to herein as a designation-constrained tracing. The focused tracing 214 includes enabling collection of trace data in the data category, collecting the trace data, and disabling collection of trace data in the data category in response to the stop trigger. The enabling and disabling are recited explicitly to emphasize that the focused tracing is not merely a time-slice or other portion of an exhaustive tracing; exhaustive tracing is not underway in any of States 1, 2, or 3. State 3 then submits 312 the trace data to an analyzer 314, and the embodiment transitions from State 3 Signal Based Trace Collection to State 4 (Trace Analysis State 408, 1154).

In some variations on FIG. 4, the monitoring 402 runs continuously. In particular, monitoring 402 runs while the embodiment is collecting an offshoot trace 316 which collects different trace data 226 than the data in the monitoring 402 or in the trace being analyzed 408. A monitoring agent informs other agents, which implement other states 1154 that do signal based collections when the monitoring agent detects any issues while continuing to monitor.

In some variations on FIG. 4, the transition is not unidirectional when the embodiment detects an issue. Some state transition architectures include a loop, for example, which is followed when the embodiment detected a long suspension issue and a signal-based collection component starts with a thread time trace and that trace indicates a problematic component (that's not the GC), causing communication back to the signal based collection component to ask it to collect a different trace 316 that's specific to that component.

The analyzer 314 performs the analysis 208 in State 4, whereby the embodiment obtains 1004 a result 1006 of the analysis. Trace analysis artifacts 422 include the analysis result(s) 1006, and artifacts computationally derived at least in part from those results, e.g., recommendations 318, offshoot trace 316 signals 308, database 1128 contents, training examples 1132, and artificial intelligence agent 330 prompts.

For example, based on the analysis some embodiments persist details to a database 1128 from analyzed traces, such as aggregated call stacks, GC metrics such as % Pause Time in GC, Heap Sizes and Execution Times to prevent regressions in the future. By building history via this database, users can track when certain regressions started and accordingly fix the code.

Some embodiments add 1130 to a repository of examples 1132 and training material that are automatically generated. These examples help guide users, e.g., as examples of best practices building on the knowledge base.

Some embodiments use generative AI 330 to generate more comprehensive reports 422 from a set of traces to delineate issues to the user. In some scenarios, this is more than a recommendation from one trace, e.g., it includes a holistic health report of this system based on available information.

In some embodiments, software implementing the functionality 204 (e.g., implementing architecture 400) resides at a central location, e.g., a team repository holding a repertoire of rules that detect issues. Then a machine 101 or VM 101 that is the subject of tracing and analysis retrieves the latest version from the central location. In some scenarios, this approach incrementally makes issue detection more powerful.

Processes (a.k.a. Methods)

Processes (which are also be referred to as "methods" in the legal sense of that word) are illustrated in various ways herein, both in text and in drawing figures. FIGS. 10 and 11 each illustrate a family of methods 1000 and 1100 respectively, which are performed or assisted by some enhanced systems, such as some systems 202 or another GCADCT functionality enhanced system as taught herein. Method family 1000 is a proper subset of method family 1100. Moreover, activities identified in diagrams in FIGS. 2 through 4 include method steps, which are likewise incorporated into method (a.k.a. process) 1100. These diagrams and flowcharts are merely examples; as noted elsewhere, any operable combination of steps that are disclosed herein may be part of a given embodiment when called out in a claim.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks in natural language an input such as a name of a program 130 which is to be analyzed 208 by the system 202. Such input is captured in the system 202 as digital text, or captured as digital audio which is then converted to digital text. Natural language means a language that developed naturally, such as English, French, German, Hebrew, Hindi, Japanese, Korean, Spanish, etc., as opposed to designed or constructed languages such as HTML, Python, SQL, or other programming languages. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 11. FIG. 11 is a supplement to the textual and figure drawing examples of embodiments provided herein and the descriptions of embodiments provided herein. In the event of any alleged inconsistency, lack of clarity, or excessive breadth due to an interpretation of FIG. 11, the content of this disclosure shall prevail over that interpretation of FIG. 11.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1100 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 11 to be non-operable, the sequence S is not within the scope of any claim. Any assertion otherwise is contrary to the present disclosure.

Some embodiments provide or utilize a garbage collection (GC) analysis method in a computing system 202, e.g., in a computer network 108. The computing system 202 is configured with a designation data structure 322 which designates 1124 a particular analysis as corresponding to a performance problem signal. This method includes automatically: during an execution of a process, getting 304 an event indicating that a garbage collection of memory of the process has ended; during the execution, detecting 306 in performance data of the garbage collection an instance of the performance problem signal; during the execution, conducting 310 a constrained (by the designation 322) tracing of the process, including changing a trace data collection status by enabling collecting of trace data in a trace data category, collecting the trace data, and then in response to a trace stop trigger changing the trace data collection status by disabling collecting of trace data in the trace data category, the trace data category and the trace stop trigger each designated in the computing system as corresponding to the performance problem signal; submitting 312 the trace data to an analysis; obtaining 1004 a result of the analysis; and in response to the result of the analysis, implementing 1008 a performance optimization action.

As an emphasis that the designation is explicit and presumptively one of multiple designations in the system 202, the following description is also provided here. A garbage collection analysis method 1100 is performed in a computing system, the computing system is configured with a first designation 322 which designates 1124 a first analysis 208 as corresponding to a first performance problem signal 308 and configured with a second designation 322 which designates 1124 a second analysis 208 as corresponding to a second performance problem signal 308. The method includes automatically: during an execution of a process, getting 304 an event indicating that a garbage collection of memory of the process has ended; during the execution, comparing 1002 performance data of the garbage collection to the first performance problem signal; during the execution, detecting 306 in the performance data an instance of the first performance problem signal; during the execution, identifying 1102 a first data category and selecting 1104 a first stop trigger, the first data category and the first stop trigger each designated 1124 in the computing system as corresponding to the first performance problem signal; during the execution, and in response to detecting the instance of the first performance problem signal, conducting 310 a designation-constrained tracing of the process, including changing a trace data collection status by enabling collecting of trace data in the first data category, collecting the trace data, and then in response to the first stop trigger changing the trace data collection status by disabling collecting of trace data in the first data category; and submitting 312 the trace data to the first analysis.

In some embodiments, implementing 1008 the performance optimization action includes conducting 310 an offshoot tracing 316 of the process during the execution in response to the analysis result, wherein the offshoot trace 316 differs from the designation-constrained trace with respect to at least one of: the trace data category or the trace stop trigger.

In some embodiments, the method 1100 includes: obtaining 1004 a result 1006 of the first analysis; and in response to the result of the first analysis, conducting 1120, 310 an offshoot tracing 316 of the process, wherein the offshoot trace differs from the designation-constrained trace with respect to at least one of: the first data category or the first stop trigger.

In some embodiments, implementing 1008 the performance optimization action includes at least one of: generating 1116 and presenting 1118 a human-readable recommendation 318 for mitigating 1150 a performance problem which corresponds to the performance problem signal; or mitigating 1150 a performance problem which corresponds to the performance problem signal by altering 1148 the program at least in part in response to the analysis result.

In some embodiments, the method 1100 includes: obtaining 1004 a result 1006 of the first analysis; and in response to the result of the first analysis, generating 1116 and presenting 1118 a human-readable recommendation 318 for mitigating 1150 a first performance problem which corresponds to the first performance problem signal.

In some embodiments, prior to getting 304 the event indicating that the garbage collection of the process has ended, garbage collection flow events are the only events 134 of the process which are traced 214.

In some embodiments, while conducting 310 the designation-constrained 212 tracing of the process, trace data in the first data category is the only data of the process which is traced.

In some embodiments, prior to conducting the designation-constrained tracing of the process, tracing 214 is not enabled for at least two of: module names 716, call stacks 718, or user-defined functions 720.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is removable or not, and is volatile or not, depending on the embodiment, can be configured in the embodiment using items such as GCADCT software 302, designation data structures 322, trace data 226, and analysis results 1006, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing embodiment functionality 204 as disclosed herein. The Figures thus help illustrate configured storage media embodiments and process (a.k.a. method) embodiments, as well as system and process embodiments. In particular, any of the method steps illustrated in FIGS. 4, 10, or 11, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a garbage collection (GC) analysis method 1100 in a computing system. This method 1100 includes automatically: during an execution of a process, getting 304 an event indicating that a garbage collection of memory of the process has ended; during the execution, comparing 1002 performance data of the garbage collection to a performance problem signal; during the execution, detecting 306 in the performance data an instance of the performance problem signal; during the execution, identifying 1102 a data category and selecting 1104 a stop trigger, the data category and the stop trigger each designated in the computing system as corresponding to the first performance problem signal; during the execution, conducting 310 a designation-constrained tracing of the process, including enabling collecting of trace data in the data category, collecting the trace data, and disabling collecting of trace data in the data category in response to the stop trigger; submitting 312 the trace data to an analysis; obtaining 1004 a result of the analysis; and in response to the result of the analysis, implementing 1008 a garbage collection optimization action, a program optimization action, or both.

In some embodiments, the implementing includes at least one of: mitigating 1150 a performance problem which corresponds to the performance problem signal by altering 1148 the program; persisting 1126 garbage collection statistics to a database 1128; adding 1130 at least a portion of the analysis result to a group of training examples 1132; or conveying 1134 at least a portion of the analysis result and at least a portion of the trace data to an artificial intelligence agent 330 via an API 332.

In some embodiments, the getting 304 through the identifying 1102 consume 1138 a first amount of a computational resource 334 during a portion of the execution of the program, performing 1140 a full tracing during a corresponding portion of a second execution of the program consumes 1138 a second amount of the computational resource, the first amount is no more than sixty percent of the second amount, and the computational resource 334 includes at least one of: processor 110 cycles, or memory 112 space.

In some embodiments, the submitting 312, the obtaining 1004, and the implementing 1008 are performed 1142 during the execution 1144 of the process.

In some embodiments, CPU sampling 1146 is not enabled prior to conducting 310 the designation-constrained 212 tracing of the process, and CPU sampling is enabled during the conducting.

Additional Observations Generally

Additional support for the discussion of GCADCT functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. It is in the context of this understanding, which pertains to all parts of the present disclosure, that examples and observations are offered herein.

Retrieving the right data via a trace file is helpful, and sometimes essential, while diagnosing Garbage Collection (GC) related performance issues. Therefore, developing an automated system based on systematic analysis can shed light on the underlying problem by expediently collecting the user's traces pertinent to the problem at hand. Different types of traces can guide the user to solve different problems, such as CPU based trace data to highlight specific offending call stacks. However, more fine-grained types of trace come at a potential cost of obscuring the problem and hence, should be prudently invoked.

Some embodiments provide or utilize an analysis-guided automated data collection process that detects issues for a user's process based on predefined rules. Some of these rules are GC-specific rules indicating likely or definitive signs of performance problems. Some of these rules are categorized based on different types of GC investigations, such as investigation into throughput, memory footprint, or tail latency. A trace data collection process continuously monitors events to detect issues based on criteria specified in the rules (as implemented, e.g., by designation data structures 322). Once this is completed, the process continues to collect data from the user's process until either an automated analysis signal is fired indicating a certain problem, or the embodiment notes 1156 that a predetermined time 1158 has elapsed 1160. Based on the type of automated analysis signal fired, the process can change 1106 the type of trace being collected based on the issue that was detected.

Some embodiments help guide developers during efforts to solve their GC centric performance problems. Guidance is specific to the problem at hand, with comprehensive analysis. Otherwise, developers will continue to spend a lot of time getting to the core of their GC related problems.

In some embodiments, the monitoring for signs of a problem is a lightweight 220 monitoring 402, which includes measuring 1164 performance associated with GC flow events. The lightweight 220 character of this monitoring 402 provides several benefits. One benefit of monitoring only for GC events is the unintrusive nature of such monitoring, which is a significant consideration for users who have a high bar of privacy to maintain. Without a data-backed business justification, some users do not permit tracing other GC centric diagnostic data. Unlike CPU monitoring, monitoring for GCEnd and/or other GC flow events doesn't encompass obtaining any other data such as module names, call stacks, or user functions. By only relying on the GC data to find out what problem the process in question might be having, embodiments can avoid getting into privacy issues that some users prioritize highly. In other words, an investigation need not to start with a more sophisticated but potentially intrusive mechanism such as collecting CPU samples to discern the GC problem the user is concerned with. Instead, investigation starts with this unintrusive monitoring, and then more intrusive mechanisms are enabled only when the issues that are flagged warrant such an escalation.

In some embodiments, some examples of problem signals and their mapped 1124 trace collection types 502 are:
  Large Number of Induced GCs:: GC Trigger Stacks
  High Suspension :: CPU Or Thread Time Trace
  Unusually Long GC :: CPU Or Thread Time Trace
  High Gen2 Fragmentation After Compaction :: GC Handle Stacks
  High Gen0 Fragmentation :: GC Handle Stacks
  Excessive LOH Triggered Gen2s :: GC Trigger Stacks In this example, Gen2 refers to GC generation 2, Gen0 refers to GC generation 0, LOH refers to Large Object Heap, and double colon :: indicates a correspondence such as a mapping via inclusion in the same designation 322.

Diagrammatically, some investigations correspond with FIG. 4. A customer or an automated performance monitor or an automated health monitor suspects 412 a GC-related problem. For instance, a customer may state "My memory use is extremely high", "GCs are lowering my throughput", or "My latency metrics are affected by the GC". More generally, the customer or developer complains about a GC related issue involving throughput, memory footprint, tail latency, or other performance indicators, and an embodiment enters State 1.

The embodiment makes an extremely lightweight 220 connection to the customer's process in question and starts collecting information about the GCs, including end-of-garbage collection events 216, such as GCEnd events 216, and/or other GC flow events 216.

In some embodiments, GCEnd events 216 are sufficient to detect problem signals, via a TraceGC object 704 or similar metadata object 704 on their payload which has information about that GC to feed into a queue with multiple TraceGC objects observed thus far in the monitoring process and use for signal 308 detection. A limitation (and corresponding privacy benefit) of TraceGC objects is that they don't have the call stack information that's associated with the reason why those signals were invoked; to explore those reasons an embodiment would have call stacks enabled, which would involve more complex command line parameters.

GCEnd events have fields for signals 308, such as the following. To ascertain that the number of LOH triggered GCs is greater than 30% of all GCs, an embodiment periodically counts up all the GCs triggered because of LOH based allocations and checks if the ratio of those versus all GCs is greater than 30%. To ascertain that the number of induced GCs is greater than 10% of all GCs, an embodiment periodically counts up all the GCs triggered if they are induced (a property for this exists on the GCEnd event's payload) and checks if the ratio of those versus all GCs is greater than 30%. To ascertain that after Gen2 Blocking GCs 804, the maximum Gen0 object sizes across all heaps is greater than 6 MB, an embodiment checks if the GC was a Gen2 Blocking GC and sums up the Gen0 heap's object sizes across all heaps and checks if they are greater than 6 MB. Other signals are detected similarly.

In some embodiments, a TraceGC class or similar class 704 is defined which includes fields such as: GCReason, an enum with reasons as to why the GC was triggered; Pause-DurationMSec, the total time 708 the user threads were paused for that GC, and Generation, the generation 706 that the GC decided to collect. In some embodiments, TraceGC events are generated by aggregating 1162 raw GC events emitted by a runtime 120. The aggregation includes taking a set of GC events emitted associated with a specific GC such as Per Heap metadata, Heap Statistics, Demarcations of a start and an end of the GC, allocations 714 that had taken place prior to the GC, etc. These individual GC results are then processed by the TraceGC class and emitted, e.g., in the case of monitoring, when a user subscribes to them and explicitly requests the aggregation 1162, e.g., via an API. This beneficially relieves the user from a burden of processing raw events.

With attention to FIG. 4, in State 2 a signal analysis is conducted which is based on a set of rules (signals 308) that indicate if there is a definitive sign of a performance problem. If no signal of a definitive performance problem is detected, the cycle of GC monitoring continues without the data validation.

If one or more signals 308 are detected, architecture 400 continues the monitoring process and starts a new trace collection process based on the type of signal(s) 308 detected. The trace collection ends based on appropriate stop trigger germane to the signal occurs. Once the trace is collected, process 400 clears 418 all GC history 420 and starts afresh with the detection of issues. Also, the trace and an LLM-based generated report is saved for the customer to analyze. The report 422 generally includes information such as an explanation of the detected issue and suggestions on how to solve the problem. In some scenarios, the report includes details such as the trace health, the exact signal that was detected, GC insights, and next steps on how the customer can solve the said problems.

As an example, consider a scenario in which a high suspension time causes unusually long GCs. A customer complains about the excessive time certain GC pauses take that is affecting the throughput of their application that must meet a certain SLA. The user starts architecture 400, which initiates the GC collection process from the user's process. The signal analysis mechanism runs every few GCs until a time when it detects that GCs have an extremely high pause time and a high suspension time, based on a pertinent rule. The trace collection mechanism is initiated with appropriate arguments and stop triggers. Concurrently, architecture 400 continues monitoring for new issues. Once the trace has been collected, a report 422 with LLM-interaction capabilities is generated that highlights the next steps as to how to solve the long suspension time by diagnosing the cause, which in this example could be a thread with higher priority interfering with GC work of the customer's process. Based on the report, the user decides to further investigate which process' thread was interfering with GC work. Then the user alters 1148 the program to remediate the issue 410. The LLM-interaction-capable report also offers the ability for the user to ask GC related questions contextualized to the data available in the trace.

In some variations, the problem 410 involves performance not related to garbage collection, such as thread starvation that does not involve GC.

Some embodiments execute a GC-centric analysis driven automated trace data collection. A suitable workflow for the analysis of performance issues includes: gather the pertinent type of events with their respective call stacks enabled for the specific performance issue, aggregate all the call stacks or retrieve call stacks based on specific start and end times, and present the call stack aggregates to the user.

Example Tracing Constraint Rules

Following are descriptions of Trace Types, including rules which are representable using designation data structure 322 items, together with some contextualization and examples of PerfView™ tool 122 invocations (mark of Microsoft Corporation). These examples include exact numbers, e.g., duration in seconds, percentage, data size, and so on. These are illustrative, but other embodiments use one or more different values than are stated in these examples yet still apply the teaching presented herein and are within the scope of claims presented.

1. Unusually Long GC Pauses. Description: The duration of the GC Pause is proportional to the amount of work GC needs to do that's based on how many objects survived the collection. When a GC takes unusually long it often means there are external factors that prevent the GC threads from doing its work in a timely fashion—this performance rule detects these anomalies, and the analysis discerns what caused the anomalous behavior.

Signal Detection Mechanism: Any of the following conditions are met: one or more ephemeral GCs have pause times >3 seconds, one or more BGCs have pause times >2 seconds, or one or more Full Blocking GCs have pause times >30 seconds. The term BGC refers to a Background Garbage Collection. It is a type of garbage collection that runs concurrently with the application's execution, minimizing the impact on the application's performance. It's different from a Full Blocking GC that stops the running of application threads. These types of collections can only sweep and don't compact the heap.

Trace Collection: Trace Type 502: CPU Stacks. "CPU Stack" refers to a stack trace of a thread at a particular point in time when CPU sample events are collected in a trace. It shows the sequence of method calls that led to the current execution point. The CPU Stacks view is a view used for performance investigations, e.g., in a PerfView™ user interface a CPU Stacks view displays the aggregated CPU call stacks. Stopping Conditions 504: Any of: ephemeral GCs have pause times >3 seconds, BGCs have pause times >2 seconds, or Full Blocking GCs have pause times >30 seconds.

Analysis 208: Get the CPU Stacks of the individual GCs with the unusually long pause times based on the Pause Start and End times of those GCs that exhibited unusually long pause times. These CPU stacks will point to why the offending GCs had unusually long pause times.

2. Excessive Large Object Heap (LOH) Triggered Gen2s. Description: The LOH is only collected with Gen2 GCs. When a scenario has many temporary LOH allocations 714, investigation will show many Gen2 GCs triggered, and these can be exceptionally long because the entire heap is collected and is especially exacerbated if the Gen2 heap is large.

Signal 308 Detection Mechanism: The number of LOH triggered GCs is greater than 30% of all GCs.

Trace Collection: Trace Type 502: GC Trigger Stacks. "GC Trigger Stacks" refers to the stack traces associated with GCTrigger events giving an indication as to what the call stack was that led to the triggering of the GC algorithm. This view is particularly helpful to diagnose cases such as the code path that triggered induced GCs or why there were so many LOH allocations. Stopping Conditions 504: If the number of LOH triggered GCs is greater than 30% of all GCs.

Analysis 208: Aggregate the GC Trigger Stacks for all LOH triggered GCs from the captured trace to get to the code that's causing the LOH reason-based GCs.

3. Excessive Induced GCs. Description: Induced GCs are a result of explicitly calling GC.Collect or another forced GC routine. It's rarely justified to induce GCs, as GC typically manages its own schedule best. Additionally, having many induced GCs is a strong sign of a performance problem, as these are Full Blocking GCs 804 and therefore collect the entire heap; they can be extremely slow, especially if the process has a large heap.

Signal 308 Detection Mechanism: The number of induced GCs is greater than 10% of all GCs.

Trace Collection: Trace Type 502: GC Trigger Stacks. Stopping Conditions 504: The number of induced GCs is greater than 10% of all GCs.

Analysis 208: Aggregate the GC Trigger Stacks for all Induced GCs to get to the exact call stack that's explicitly calling GC.Collect or a similar routine, from the collected trace.

4. Gen0 Excessive Demotion. Description: When pinning occurs, GC may choose to leave pinned objects in Gen0 so that the free space between them can be used for gen0 allocations and the heap doesn't get extended too quickly; this process is called demotion. If, however, there is a lot of demotion detected by a large Gen0 object size after a Full Blocking GC because too many pinned objects are left on Gen0, this is a performance issue as the Gen0 space isn't being used efficiently.

Signal 308 Detection Mechanism: After Gen2 Blocking GCs, the maximum Gen0 object size across all heaps is >6 MB.

Trace Collection: Trace Type 502: GC Handle Stacks. GC Handle Stacks refer to the stack traces associated with GCHandleEvents or similar variables in a given environment, giving an indication as to what call stacks 714 led to the allocation of GC Handles. This view is particularly helpful to diagnose cases such as the code path that led to the allocation of many Pinned Handles that can cause the GC heap getting fragmented. GC Handles are used to maintain references to objects in managed memory. They are created and managed by a runtime 120, e.g., the .NET™ runtime (mark of Microsoft Corporation). In some environments, there are different types of GC Handles, including strong handles, weak handles, and pinned handles. Strong handles prevent the GC from collecting an object as long as the handle is active. Weak handles allow the GC to collect an object if there are no strong references to it. Pinned handles are used to prevent the GC from moving an object in memory. GC Handles are used internally by the runtime and are not directly accessible to application code. The GC uses GC Handles to determine which objects are still in use and which can be collected. Stopping Conditions 504: Full Blocking GCs and the Max Gen0 Object Size is >6 MB.

Analysis 208: Aggregate the call stack from GCHandle events for Pinned Handles filtered to those on Gen0. This aggregated call stack will contain the offending frame that's the impetus of the excessive pinned handles.

5. High Gen2 Fragmentation. Description: If a system did a full compacting GC and there is still high fragmentation 614 in Gen2, it means pinning is preventing the GC from compacting, otherwise, one would have observed a large portion of Gen2 only occupied by live objects.

Signal 308 Detection Mechanism: The Total Gen2 Object Size After Full Blocking GC/Total Gen2 Size After Full Blocking GC <70%. That is, a majority of the Gen2 Size after a full blocking GC that compacts should be primarily for objects and not free space, the presence of which indicates fragmentation due to pinning.

Trace Collection: Trace Type 502: GC Handle Stacks. Stopping Conditions 504: >2 Full Blocking GCs and The Total Gen2 Object Size After Full Blocking GC/Total Gen2 Size After Full Blocking GC <70%.

Analysis 208: Aggregate the call stack from GCHandle events for Pinned Handles filtered to those on Gen2. This aggregated call stack will contain the offending frame that's the impetus of the excessive pinned handles.

6. Long Suspension. Description: Before triggering a GC, a system suspends managed threads to stop their execution. This process normally takes very little time (10 s of microseconds or less) and higher suspension times indicate definite signs of performance problems.

Signal 308 Detection Mechanism: Total Suspension Time is greater than 5% of Total Pause Time. Suspension Time is encapsulated in the Total Pause Time and should, in normal circumstances be <1 Msec.

Trace Collection Arguments: Trace Type 502: CPU Stacks. Stopping Conditions 504: Either of: Suspension >2 Msec, or Total Suspension Time >5% of Total Pause Time.

Analysis 208: CPU Stacks of the specific GCs with High Suspension Cases. These CPU stacks via their Inclusive, Exclusive samples and Histogram of activity will indicate if the high suspension is a result of an issue in the runtime itself, else if the high suspension is a result of CPU being stolen from another process.

7. Excessive Pauses Full Blocking GC. Description: Full Blocking GCs usually take longer than other GCs as they must collect the entire heap and block the managed application from running while doing so. Full Blocking GCs exhibiting excessive pauses is, however, an indication of a performance problem and indicates further investigation is prudent.

Signal 308 Detection Mechanism: Total Full Blocking GC Pauses are >30% of Total GC Pauses.

Trace Collection: Trace Type: From the accumulated GCs used to detect the signal, discern if there is a dominant condemn reason for this issue, with the most common reasons being: Induced, Fragmented Gen2, Small Heap. In this set of scenarios involving excessive pauses in a full blocking GC, there are three main actionable paths, depending on a dominant condemn reason. If the dominant condemn reason is Induced, then Trace Type 502 is GC Trigger Stacks and Stopping Condition 504 is the number of induced GCs is greater than 10% of all GCs. If the dominant condemn reason is Fragmented Gen2 then Trace Type 502 is GC Handle Stacks and Stopping Condition 504 is >2 Full Blocking GCs and The Total Gen 2 Object Size After Full Blocking GC/Total Gen2 Size After Full Blocking GC <70%. If the dominant condemn reason is Small Heap then Trace Type 502 is CPU Stacks and Stopping Condition 504 is any of: Ephemeral GCs have pause times >3 Seconds, BGCs have pause times >2 Seconds, or Full Blocking GCs have pause times >30 Seconds.

Analysis 208: The analysis depends on the type of trace collected based on the dominant condemn reason. If the dominant condemn reason is Induced then aggregate the GC Trigger Stacks for all Induced GCs to get to the exact call stack that's explicitly calling GC.Collect or similar routine from the collected trace. If the dominant condemn reason is Fragmented Gen2 then aggregate the call stack from GCHandle events for Pinned Handles filtered to those on Gen2. This aggregated call stack will contain the offending frame that's the impetus of the excessive pinned handles. If the dominant condemn reason is Small Heap then get the CPU Stacks of the individual GCs with the unusually long pause times based on the Pause Start and End times of the said GCs that exhibited unusually long pause times. These CPU stacks will point to why the offending GCs had unusually long pause times.

As further information, PerfView™ tool command lines 224 with arguments are shown below for various categories 502 of trace data. These are examples. Some embodiments use different command lines 224, with other arguments or other tools than the PerfView™ tool 122.

GC Trigger Stacks. PerfView.exe/nogui/accepteula /KernelEvents=Process+Thread+ImageLoad/ClrEvents: GC+Stack /ClrEventLevel:Informational/BufferSize:3000/CircularMB:3000 collect.

CPU Stacks. PerfView.exe/nogui/accepteula /KernelEvents=Process+Thread+ImageLoad+Profile/ClrEvents:GC+Stack /BufferSize:3000/CircularMB:3000/Merge:TRUE/ZIP:True collect.

GC Handle Stacks. PerfView.exe/nogui/accepteula /KernelEvents=Process+Thread+ImageLoad+Profile /ClrEvents:GC+Stack+GCHandle/BufferSize:3000/CircularMB:3000 /ClrEventLevel=Informational collect.

Allocation Stacks. PerfView.exe/nogui/accepteula /KernelEvents=Process+Thread+ImageLoad+Profile/ClrEvents:GC+Stack /BufferSize:3000/CircularMB:3000/ ClrEventLevel=Verbose collect.

GCCollectOnly. PerfView.exe/nogui/accepteula/GCCollectOnly collect.

Example Prototype Code and Architecture

One example prototype uses the PerfView™ tool in a .NET™ environment (marks of Microsoft Corporation). A GCInfo object is a custom class consisting of a subset of properties used for the signals from the TraceGC class, instances of which encapsulate GC metrics at the end of a GC. This is accomplished using GCInfo.cs code such as the following:

```
internal sealed class GCInfo
{
  public GCInfo(TraceGC gc)
  {
    GCIndex=gc.Number;
    PauseDurationMSec=gc.PauseDurationMSec;
    SuspensionDurationMSec=gc.SuspendDurationMSec;
    HeapSizeAfterMB=gc.HeapSizeAfterMB;
    HeapSizeAfterMB=gc.HeapSizeAfterMB;
    Generation=gc.Generation;
    Reason=gc.Reason;
    PromotedBytesMB=gc.PromotedMB;
  }
  public int GCIndex {get;}
  public double PauseDurationMSec {get;}
  public double SuspensionDurationMSec {get;}
  public double HeapSizeBeforeMB {get;}
  public double HeapSizeAfterMB {get;}
  public int Generation {get;}
  public GCReason Reason {get;}
  public double PromotedBytesMB {get;}
}
```

In this example, a Processing Queue is a thread-safe abstraction that keeps track of incoming GCInfo objects. A producer adds GCInfo objects to this queue and a consumer takes GCInfo out from this queue and checks if any of the signals are matched. This was implemented as a BlockingCollection<GCInfo>.

The Producer is a light-weight abstraction 222 whose sole purpose is to subscribe to the GCEnd Trace events for a particular process. The producer then adds GCInfo objects constructed from the TraceGC object at the end of a GC to the processing queue that the Consumer abstracts consumes on a separate thread. A goal is to keep the work the Producer does to a minimum, in order to prevent interference with the GCs, to prevent artificially inflating the GC pause time. This is accomplished using Producer.cs code such as the following:

```
// Assume _inQueue defined as: "private readonly BlockingCollection<GCInfo>
_inQueue = new BlockingCollection<GCInfo>( );"
// Assume _processId is for the process in question that's active.
// The Producer.
using (_traceEventSession = new
TraceEventSession($"GCMonSession_{Guid.NewGuid( )}"))
{
  ETWTraceEventSource source = _ traceEventSession.Source;
  source.NeedLoadedDotNetRuntimes( );
  source.AddCallbackOnProcessStart((TraceProcess traceProcess) =>
  {
    traceProcess.AddCallbackOnDotNetRuntimeLoad((TraceLoadedDotNetRuntime
  runtime) =>
    {
      runtime.GCEnd += (TraceProcess p, TraceGC gc) =>
      {
        // Reject event if it doesn't match that of the process id in question.
        if (p.ProcessID != _processId)
        {
          return;
        }
        // Add a new GCInfo object to the procesing queue.
        _inQueue.Add(new GCInfo(gc));
      };
    });
  });
  // Blocking Call.
  source.Process( );
}
```

The Consumer processes the incoming GCInfo from the Processing Queue on a separate thread to prevent any interference with the Producer, then after each new item, checks to see if any of the signals are fired. This is accomplished using Consumer.cs code along the lines shown below, which is contextualized here for Excessive Induced GCs. This snippet also includes code that invokes the Trace Collection Mechanism 224. Based on the type of signal, the prototype invoked a trace collection mechanism with the pertinent parameters including the stop trigger flag that'll automatically stop the tracing.

```
// Assume _inQueue defined as: "private readonly BlockingCollection<GCInfo>
_inQueue = new BlockingCollection<GCInfo>( );"
// Assume _processId is for the process in question that's active.
// Assume PerfView.exe referenced below has all the custom stop triggers
defined.
// Start Consumption Task that runs forever whose sole purpose is to
// consume the GCInfo objects from the producer and discerning if there is a
performance issue.
_consumptionTask = Task.Run(( ) =>
   while (true)
   {
      foreach (var gcInfo in _inQueue.GetConsumingEnumerable( ))
      {
         // Aggregate the info.
         ++TotalNumberOfGCs;
         if (gcInfo.Reason == GCReason.Induced)
         {
            ++NumInducedGCs;
         }
         // Signal to check if there are excessive induced GCs.
         bool CheckIfExcessiveInducedGCs( )
         {
            return NumInducedGCs / TotalNumberOfGCs > 0.1;
         }
         // Check if the Signal is fired.
         if (CheckIfExcessiveInducedGCs( ))
         {
            // Reset the variables.
            NumInducedGCs = 0;
            TotalNumberOfGCs = 0;
            // Start the trace collection process.
            // Only one allowed at once.
            if ( !_collecting Trace )
            {
               _collecting Trace = true;
               Process traceProcess = new Process( );
               string stopping Trigger = "/StopOnExcessiveInducedGCs";
               string gcTriggerStackArguments = "/nogui /accepteula
/KernelEvents=Process+Thread+ImageLoad /ClrEvents:GC+Stack
/ClrEventLevel: Informational /BufferSize:3000 /CircularMB:3000";
               traceProcess.StartInfo.UseShellExecute = false;
               traceProcess.StartInfo.FileName = "./PerfView.exe";
               traceProcess.StartInfo.Arguments = $" /Process {_processId}
{stoppingTrigger} {gcTriggerStackArguments} collect";
               traceProcess.StartInfo.CreateNoWindow = true;
               traceProcess.Start( );
               // The stop trigger will automatically stop the trace and therefore it's
not necessary to stop.
            }
         }
      }
   }
});
```

The Analyzer looks out for newly added trace files and automatically processes them. This is accomplished using Analyzer_ExcessiveInducedGCs.cs code along the lines shown below, which includes the mechanism of aggregating GCTrigger call stacks for the process in question and displays the most common call stack.

Initially, get all the induced events.

```
var events = issue.TraceLog.Events.Filter(e => e.EventName == "GC/Triggered"
&& e.ProcessID == issue.ProcessId && e.PayloadByName("Reason").ToString( )
== "Induced");
         Then check if they have call stacks.
if (events != null && events.Count( ) > 0 && events.Any(e => e.CallStack( ) != null)
{
   // Construct scaffolding of Aggregated Call Stacks based on filtered events.
   var traceStackSource = new TraceEventStackSource(events);
   traceStackSource.ShowUnknownAddresses = true;
   var allStackSource = CopyStackSource.Clone(traceStackSource);
   var symbolReader = App.GetSymbolReader(issue.TraceLog.FilePath);
   var process = issue.TraceLog.Processes.FirstOrDefault(p => p.ProcessID ==
issue.ProcessId);
```

```
    // Filter out any thread specific frames.
    var filterParams = new FilterParams( );
    filterParams.GroupRegExs = "[fold threads]     Thread -> AllThreads";
    FilterStackSource filterStackSource =
        new FilterStackSource(filterParams, allStackSource,
ScalingPolicyKind.ScaleToData);
    var stackView = new StackView(new
AutomatedAnalysisTraceLog(issue.TraceLog, symbolReader), filterStackSource,
process.ProcessIndex, symbolReader);
    // Resolve Symbols.
    stackView.ResolveSymbols("coreclr");
    stackView.ResolveSymbols("clrgc");
    foreach (var m in process.LoadedModules) {
        stackView.ResolveSymbols(m.ModuleFile.Name.Replace(".dll", ""));
    }
            Recursively find the most common callstack.
    Dictionary<List<CallTreeNode>, float>
mostCommonCallStackBasedOnInclusiveCount = new
Dictionary<List<CallTreeNode>, float>( );
    CallTreeNode iterator = stackView.CallTree.Root;
    CallTreeNode callee Tree = AggregateCallTreeNode.CalleeTree(iterator);
    foreach (var bid in calleeTree.Callees) {
      // 1. Add current nodes info.
      void DFS(CallTreeNode current) {
        // Base case.
        if (current.Callees == null | current.Callees.Count == 0) {
          // At the leaf, pop back-up. First, add the leaf frame to the runner. Next,
          go up the caller path to construct an already available reversed call stack.
          CallTreeNode cursor = current;
          List<CallTreeNode> nodes = new List<CallTreeNode>( );
          while (cursor.Caller != null) {
            nodes.Add(cursor);
            cursor = cursor.Caller;
          }
          if
(!mostCommonCallStackBasedOnInclusiveCount.TryGetValue(nodes, out var
val)) {
              mostCommonCallStackBasedOnInclusiveCount[nodes] =
cursor.InclusiveCount;
          }
          else {
              mostCommonCallStackBasedOnInclusiveCount[nodes] += val;
          }
          // At this point have all pertinent nodes for one complete call-stack.
        }
        if (current.Callees != null) {
          foreach (var callee in current.Callees)
          {
            DFS(callee);
          }
        }
      }
    // 2. Add Recurse across all nodes.
    // Kick off DFS.
    DFS(iterator);
    }
    // Decide to traverse root.
    DataTable table = new DataTable( );
    table.Columns.Add("Frames");
    table.Columns.Add("Exclusive Count");
    table.Columns.Add("Inclusive Count");
    KeyValuePair<List<CallTreeNode>, float> first =
        mostCommonCallStackBasedOnInclusiveCount.OrderByDescending(k =>
k.Value).ToList( ).FirstOrDefault( );
    for (int depthIdx = 0; depthIdx < first.Key.Count; depthIdx++) {
      var r = first.Key[depthIdx];
      string stackSymbol = depthIdx == 0 ? "" : "+";
      string display = string.Join("", Enumerable.Repeat(" ", depthIdx)) +
stackSymbol + r.DisplayName;
      table.Rows.Add(new object[ ] { display, r.ExclusiveCount, r.InclusiveCount });
    }
  }
}
```

The DataTable "table" at this point will contain formatted aggregated call stack to be displayed as an HTML table.

In terms of data flow overall, the Producer subscribes to GCEnd events and TraceGC to GCInfo flows into the Processing Queue. GCInfo flows from the Processing Queue to the Consumer, which performs GCInfo aggregation and signal detection. A detected signal flows to Trace Collection, which uses a PerfView.exe/StopTrigger Args Collect command 224 to collect the Trace File 226, which flows to the Analyzer, which creates a Report.

Comparison of Focused Tracing Versus Full Tracing

Advantages of some embodiments include a lower use of computational resources for tracing, and less irrelevant data in the trace. In some embodiments, tracing is focused in content by the designation's data category constraint, and focused in time by the designation's problem signal detection and the designation's stop trigger constraints. To illustrate the higher costs of full tracing, the following observations are offered.

As a proxy for resource consumption, an experiment ran web application-based benchmarks called Stage2, with Server GC enabled. Using this benchmark aided discerning performance in an isolated environment to prevent other factors from affecting the results. The experiment ran this code first with a lightweight GC trace collection, then without any monitoring or trace collection, and finally with the default tracing parameters that collect more intrusive and more voluminous events such as CPU stacks that can artificially inflate the GC. The metrics included Max CPU Utilization, Max Working Set Memory, and Throughput in the form of Requests/Second and Median Latency from the client. The maximums are useful for discerning resource limits and the Throughput and Latency are proxies of how much interference the more voluminous tracing mechanism has on the overall process. The Max is the Diff % between the maximum corresponding metric between the run with the more voluminous collection and the one with GCCollectOnly collection collected from the Stage2 Benchmark and obtained from the Perf Counters. For example, Max CPU Diff % is the percentage difference of the Max CPU % from the GCCollectOnly collection vs. the more voluminous collection.

In testing, the Default (voluminous collection) Tracing's Args for containing CPU Stacks and Managed Frames are:
/BufferSizeMB:3000
/StackCompression/CircularMB:3000
/KernelEvents:Process,Thread,ImageLoad,Profile/ClrEventLevel:Informational
/ClrEvents:GC,JITSymbols,Type,GCHeapAndTypeNames,Stack,Codesymbols,C
ompilation whereas the GCCollectOnly ones are: /BufferSizeMB:256
/StackCompression/KernelEvents:Process/ClrEventLevel:Informational
/ClrEvents:GC.

Results are shown below.

TABLE 1

Stage2 Server GC

| Comparison Diff % Against No Tracing | Lightweight GC Tracing | Default Tracing | Diff Between Light Weight GC Tracing % and Default Tracing % |
|---|---|---|---|
| Max CPU Diff % | 1.22 | 14.32 | 13.10 |
| Max Working Set Diff % | 0.57 | 1.1 | 0.53 |
| Requests/Second Diff % | −1.11 | −4.42 | −3.31 |
| Median Latency Diff % | 1.03 | 4.12 | 3.09 |

In Table 1, the second and third columns are the % differences between the results of no tracing and with the different types of tracing, and the fourth column is the difference between the two. All three numeric columns indicate the relative differences of resource consumption as the trace type varies. From the data in Table 1, it's clear based on all these proxies there is a stark difference in terms of resource consumption between the two. Such differences are likely to be even more pronounced for real life applications, as these data are only from benchmarks. Table 2 shows a summary of measured differences.

TABLE 2

Summary of Tracing Resource Consumption Differences
Lightweight GC Tracing vs. Default Tracing % Diff

| Max CPU Diff % | 12.94 |
|---|---|
| Max Working Set Diff % | 0.53 |
| Requests/Second Diff % | 3.06 |
| Median Latency Diff % | 5.24 |

It may be asserted that an alternative to the dynamic constrained tracing taught herein is to presume that a trace with relevant data already exists and analyze that trace to diagnose a program's performance problem after execution of the program is complete. But as a practical matter, ensuring the relevant data is captured means also capturing lots of irrelevant data, because one does not know ahead of the execution which data will be relevant. Another approach would be live debugging, while the program is running. But live debugging inserts human reaction times into the execution time, which immensely degrades program performance and sometimes masks the underlying cause of the performance problem. Accordingly, the approaches taught here gather a higher percentage of relevant data, faster and more efficiently, and do so without imposing a tracing cost that substantially changes the program's performance.

Machine Learning Models, Including Language Models

A language model or other machine learning model within or utilized by an enhanced system 202 is not necessarily a large language model (LLM) in every embodiment, but it is an LLM in some embodiments. For present purposes, a language model is "large" if it has at least a billion parameters. For example GPT-2 (OpenAI), MegatronLM (NVIDIA), T5 (Google), Turing-NLG (Microsoft), GPT-3 (OpenAI), GPT-3.5 (OpenAI), GPT-4 (OpenAI), and LLaMA versions (Meta AI) are each a large language model (LLM) for purposes of the present disclosure, regardless of any definitions to the contrary that may be present in the industry. Some examples of models include language models which are large language models, large language models (LLMs), multimodal language models, and foundation models.

Language model stability is a consideration in some embodiments and some scenarios. Instability leads to inconsistency in language model responses to prompts. Language model stability is sometimes dependent on language model parameters. Some different large language models have different stability parameters, and some exhibit different variability between answers to the same question even while using the same stability parameters. Some models are stabilized by adjusting parameters such as temperature, frequency penalty, presence penalty, or nucleus sampling, and also or instead by constraining the queries sent to a given instance of the model. In some scenarios, model performance is optimized by use of suitable training data, fine-tuning, prompt engineering, or a combination thereof.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code. IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as computing system memory garbage collection, measuring 1164 garbage collection performance, signal monitoring 402, and program execution tracing 214, which are each an activity deeply rooted in computing technology. Some of the technical mechanisms discussed include, e.g., GCADCT software 302, designation data structures 322, trace data analyzers 314, and garbage collectors 124. Some of the proactive automatic technical effects discussed include, e.g., lightweight 220 monitoring 402 which avoids exposure of private data 218, focused 212 tracing 214 which provides relevant data 226 in higher proportions and at lower resource costs than exhaustive tracing, and dynamic re-focusing 316, 1106 of tracing while a program executes. Thus, purely mental processes and activities limited to pen-and-paper are clearly excluded from the scope of any embodiment. Other advantages based on the technical characteristics of the teachings will also be apparent to one of skill from the description provided.

One of skill understands that garbage collection in a system 102 is technical activity which cannot be performed mentally at all, and cannot be performed manually with the speed and accuracy required in computing systems. Hence, garbage collection performance analysis technology improvements such as the various examples of GCADCT functionality 204 described herein are improvements to computing technology. One of skill understands that attempting to manually enable and disable tracing to collect relevant GC data and manually compute relevant GC statistics 320 or perform GC analysis 208 would create unacceptable delays, and introduce unnecessary and unacceptable human errors. People manifestly lack the speed, accuracy, memory capacity, and specific processing capabilities required to perform GC analysis as taught herein.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as an enhanced PerfView™ tool, an enhanced integrated development environment, or an enhanced tool for monitoring application program performance and collecting diagnostic artifacts such as GC traces.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to efficiently and accurately identify possible causes of application program performance problems that involve garbage collection, how to obtain sufficient trace data to diagnose a program's performance problem without obscuring or compounding performance problem causes by changing the program's performance in order to obtain the trace data, and how to adapt trace data collection to a program's behavior while the program is executing. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, language models, prompts, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CLI: command line interface, command line interpreter
CPU: central processing unit
DLL: dynamic link library
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
IDE: integrated development environment
LAN: local area network
OS: operating system
PaaS or PAAS: platform-as-a-service
RAM: random access memory
ROM: read only memory
SLA: service level agreement
TPU: tensor processing unit
UEFI: Unified Extensible Firmware Interface
UI: user interface
WAN: wide area network

Some Additional Terminology

Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" as a noun means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account or user session, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or a user session or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "method"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. GCADCT operations such as monitoring 402 for GC flow events 216, analyzing 404 data 424 for performance problem signals 308, analyzing 208 trace data 226, and many other operations discussed herein (whether recited in the Figures or not), are understood to be inherently digital and computational. A human mind cannot interface directly with a CPU or other processor, or with RAM or other digital storage, to read and write the necessary data to perform the GCADCT steps 1100 taught herein even in a hypothetical situation or a prototype situation, much less in an embodiment's real world large computing environment, e.g., a computer network 108 environment or with an AI agent. This would all be well understood by persons of skill in the art in view of the present disclosure. Moreover, one of skill understands that GCADCT functionality cannot be implemented using merely conventional tools and steps, because actual implementation requires the use of teachings which were first provided in the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as adding, aggregating, altering, analyzing, changing, clearing, comparing, conducting, constraining, consuming, conveying, designating, detecting, disabling, enabling, ending, excluding, generating, getting, identifying, implementing, investigating, mitigating, monitoring, noting, obtaining, optimizing, performing, persisting, presenting, sampling, selecting, specifying, starting, stopping, submitting, transitioning (and adds, added, aggregates, aggregated, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Remarks Regarding Reference Numerals

Reference numerals are provided for convenience and in support of the drawing figures and as part of the text of the specification, which collectively describe aspects of embodiments by reference to multiple items. Items which do not have a unique reference numeral may nonetheless be part of a given embodiment. For better legibility of the text, a given reference numeral is recited near some, but not all, recitations of the referenced item in the text. The same reference numeral may be used with reference to different examples or different instances of a given item.

The following remarks pertain to particular reference numerals:
- 100 operating environment, also referred to as computing environment; includes one or more systems 102
- 101 machine in a system 102, e.g., any device having at least a processor 110 and having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or non-empty set of processors; includes hardware
- 112 computer-readable storage medium, e.g., RAM, hard disks; also referred to as storage device
- 114 removable configured computer-readable storage medium
- 116 instructions executable with processor; may be on removable storage media or in other memory (volatile or nonvolatile or both)
- 118 digital data in a system 102; data structures, values, source code, and other examples are discussed herein
- 120 kernel(s), e.g., operating system(s), BIOS, UEFI, device drivers; also refers to an execution engine such as a language runtime
- 122 software tools, software applications, security controls; hardware tools; computational
- 124 garbage collector or garbage collection, also referred to as GC
- 126 display screens, also referred to as "displays"; reference numeral 126 also refers to the computational activity of presenting data in a user interface, visually, audibly, haptically, or otherwise
- 128 computing hardware not otherwise associated with a reference numeral 106, 108, 110, 112, 114
- 138 cloud, also referred to as cloud environment or cloud computing environment
- 202 enhanced computing system, i.e., system 102 enhanced with functionality 204 as taught herein
- 204 GCADCT functionality (also referred to as functionality 204), e.g., software or specialized hardware which performs or is configured to perform steps 306 and 310, or steps 304 and 1002, or steps 402 and 404, or a constrained 212 version of step 406 or step 310, or any software or hardware which performs or is configured to perform a garbage collection related performance problem investigation or mitigation activity first disclosed herein, or to perform a novel method 1100 first disclosed herein
- 226 GC trace, e.g., a digital record of GC activity, as represented in a computing system
- 320 GC statistic, e.g., a statistical summary or other statistic derived computationally from GC activity, as represented in a computing system
- 322 GC performance rule, e.g., as implemented in a designation data structure 322, e.g., a rule indicating problematic performance related to GC, e.g., a range or other threshold 336 indicating normal or acceptable values of a GC statistic; some examples include rules specifying what qualifies as a large number of induced GCs, what qualifies as a high suspension rate, what qualifies as a long GC, or what qualifies as a high amount of fragmentation 614 after compaction
- 1000 flowchart; 1000 also refers to GCADCT methods that are illustrated by or consistent with the FIG. 10 flowchart or any variation of the FIG. 10 flowchart described herein; all GCADCT method steps are computational, not human activity
- 1100 flowchart; 1100 also refers to GCADCT methods that are illustrated by or consistent with the FIG. 11 flowchart, which incorporates the FIG. 10 flowchart and all other steps taught herein, or methods that are illustrated by or consistent with any variation of the FIG. 11 flowchart described herein; all GCADCT method steps are computational, not human activity
- 1170 any step or item discussed in the present disclosure that has not been assigned some other reference numeral; 1170 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments perform lightweight monitoring 402 for garbage collection (GC) flow events 216, then perform focused tracing 214 after detecting 306 a performance problem signal 308. The tracing is focused by constraints 212 which are specified 1124 in a designation data structure 322, including a performance problem signal definition 308, a corresponding trace data category 502 and a corresponding tracing stop trigger 504. Tracing 214 is done only in the specified category 502 and only for the specified time period between detection 306 and stopping 504; this reduces or avoids collection of irrelevant trace data and reduces or avoids changes in program behavior caused by the tracing itself. Some designation data structures 322 also specify a corresponding trace data analysis 208. In operation, some embodiments dynamically re-focus 1106 tracing 214 on an offshoot trace 316 in response to a trace data analysis result 1006 which is obtained 1004 while the program is still executing 1144.

Embodiments are understood to also themselves include or benefit from tested and appropriate security controls and privacy controls such as the General Data Protection Regulation (GDPR). Use of the tools and techniques taught herein can be used together with such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A garbage collection analysis method performed in a computing system, the computing system configured with a designation data structure which designates an analysis as corresponding to a performance problem signal, the method comprising automatically:

during an execution of a process, measuring garbage collection performance and getting an event indicating that a garbage collection of memory of the process has ended;

during the execution, detecting in performance data of the garbage collection an instance of the performance problem signal;

during the execution, and in response to detecting the instance of the performance problem signal, conducting a constrained tracing of the process, including changing a trace data collection status by enabling collecting of trace data in a trace data category, collecting the trace data, and then in response to a trace stop trigger changing the trace data collection status by disabling collecting of trace data in the trace data category, the trace data category and the trace stop trigger each designated in the computing system as corresponding to the performance problem signal;

submitting the trace data to an analysis which includes a garbage collection analysis;

obtaining a result of the analysis; and in response to the result of the analysis, implementing a performance optimization action.

2. The method of claim 1, wherein implementing the performance optimization action comprises conducting an offshoot tracing of the process during the execution in response to the analysis result, wherein the offshoot trace differs from the constrained trace with respect to at least one of: the trace data category or the trace stop trigger.

3. The method of claim 1, wherein implementing the performance optimization action comprises at least one of:

generating and presenting a human-readable recommendation for mitigating a performance problem which corresponds to the performance problem signal; or mitigating a performance problem which corresponds to the performance problem signal by altering the program at least in part in response to the analysis result.

4. The method of claim 1, wherein prior to getting the event indicating that the garbage collection of the process has ended, garbage collection flow events are the only events of the process which are traced.

5. The method of claim 1, wherein while conducting the constrained tracing of the process, trace data in the first data category is the only data of the process which is traced.

6. The method of claim 1, wherein prior to conducting the constrained tracing of the process, tracing is not enabled for at least two of: module names, call stacks, or user-defined functions.

7. A computing system, comprising:

at least one digital memory;

a designation set data structure residing in the at least one digital memory, the designation set data structure comprising a non-empty set of one or more designations, each designation specifying a performance problem signal, a corresponding trace data category, a corresponding trace stop trigger, and a corresponding analysis;

at least one processor in operable communication with the at least one digital memory, the at least one processor configured to perform a garbage collection analysis method during an execution of a process, wherein the garbage collection analysis method comprises (a) getting an event indicating that a garbage collection of memory of the process has ended, (b) comparing performance data of the garbage collection to a particular designation in the set, (c) detecting in the performance data an instance of the particular designation's performance problem signal, (d) conducting a designation-constrained tracing of the process, including enabling collecting of trace data in the particular designation's trace data category, collecting the trace data, and disabling collecting of trace data in the particular designation's data category in response to the particular designation's stop trigger, and (e) submitting the trace data to the particular designation's analysis.

8. The computing system of claim 7, wherein the particular designation comprises at least one of:

a designation specifying a garbage collection pause duration performance problem signal, a processor stacks data category, a garbage collection pause duration stop trigger, and a processor stacks and garbage collection pause duration analysis; or a designation specifying a garbage collection suspension duration performance problem signal, a processor stacks data category, a garbage collection suspension duration stop trigger, and a processor stacks and garbage collection suspension duration analysis.

9. The computing system of claim 7, wherein the particular designation comprises at least one of:

a designation specifying a large object heap garbage collection performance problem signal, a garbage collection trigger stacks data category, a large object heap garbage collection stop trigger, and a large object heap garbage collection and garbage collection trigger stacks analysis; or a designation specifying a garbage collection generation maximum object size performance problem signal, a garbage collection handle stacks data category, a blocking garbage collection and object size stop trigger, and a garbage collection handle stacks analysis.

10. The computing system of claim 7, wherein the particular designation comprises at least one of:
   a designation specifying a garbage collection full blocking pause duration performance problem signal, a garbage collection trigger stacks data category, an induced garbage collection stop trigger, and a garbage collection trigger stacks analysis;
   a designation specifying a garbage collection full blocking pause duration performance problem signal, a garbage collection handle stacks data category, an object size stop trigger, and a garbage collection pinned handles analysis; or
   a designation specifying a garbage collection full blocking pause duration performance problem signal, a processor stacks data category, a garbage collection pause duration stop trigger, and a garbage collection pause duration and processor stacks analysis.

11. The computing system of claim 7, wherein the particular designation comprises a designation specifying an induced garbage collection performance problem signal, a garbage collection trigger stacks data category, an induced garbage collection stop trigger, and an induced garbage collection and garbage collection trigger stacks analysis.

12. The computing system of claim 7, wherein the set of designations comprises at least two of:
   a designation specifying a garbage collection pause duration performance problem signal, a processor stacks data category, a garbage collection pause duration stop trigger, and a processor stacks and garbage collection pause duration analysis;
   a designation specifying a large object heap garbage collection performance problem signal, a garbage collection trigger stacks data category, a large object heap garbage collection stop trigger, and a large object heap garbage collection and garbage collection trigger stacks analysis;
   a designation specifying an induced garbage collection performance problem signal, a garbage collection trigger stacks data category, an induced garbage collection stop trigger, and an induced garbage collection and garbage collection trigger stacks analysis;
   a designation specifying a garbage collection generation maximum object size performance problem signal, a garbage collection handle stacks data category, a blocking garbage collection and object size stop trigger, and a garbage collection handle stacks analysis;
   a designation specifying a garbage collection suspension duration performance problem signal, a processor stacks data category, a garbage collection suspension duration stop trigger, and a processor stacks and garbage collection suspension duration analysis;
   a designation specifying a garbage collection full blocking pause duration performance problem signal, a garbage collection trigger stacks data category, an induced garbage collection stop trigger, and a garbage collection trigger stacks analysis;
   a designation specifying a garbage collection full blocking pause duration performance problem signal, a garbage collection handle stacks data category, an object size stop trigger, and a garbage collection pinned handles analysis; or
   a designation specifying a garbage collection full blocking pause duration performance problem signal, a processor stacks data category, a garbage collection pause duration stop trigger, and a garbage collection pause duration and processor stacks analysis.

13. The computing system of claim 12, wherein the set of designations comprises at least three of the designations.

14. The computing system of claim 12, wherein the set of designations comprises at least four of the designations.

15. The computing system of claim 7, wherein the analysis of the trace data indicates a security violation or a security vulnerability in the computing system.

16. A computer-readable storage device configured with data and instructions which upon execution by a processor perform a garbage collection analysis method in a computing system, the method comprising automatically:
   during an execution of a process, getting an event indicating that a garbage collection of memory of the process has ended;
   during the execution, comparing performance data of the garbage collection to a performance problem signal;
   during the execution, detecting in the performance data an instance of the performance problem signal;
   during the execution, identifying a data category and selecting a stop trigger, the data category and the stop trigger each designated in the computing system as corresponding to the first performance problem signal;
   during the execution, conducting a designation-constrained tracing of the process, including enabling collecting of trace data in the data category, collecting the trace data, and disabling collecting of trace data in the data category in response to the stop trigger;
   submitting the trace data to an analysis;
   obtaining a result of the analysis; and
   in response to the result of the analysis, implementing a garbage collection optimization action, a program optimization action, or both.

17. The computer-readable storage device system of claim 16, wherein the implementing comprises at least one of:
   mitigating a performance problem which corresponds to the performance problem signal by altering the program;
   persisting garbage collection statistics to a database;
   adding at least a portion of the analysis result to a group of training examples; or
   conveying at least a portion of the analysis result and at least a portion of the trace data to an artificial intelligence agent.

18. The computer-readable storage device system of claim 16, wherein the getting through the identifying consume a first amount of a computational resource during a portion of the execution of the program, performing a full tracing during a corresponding portion of a second execution of the program consumes a second amount of the computational resource, the first amount is no more than sixty percent of the second amount, and the computational resource includes at least one of: processor cycles, or memory space.

19. The computer-readable storage device system of claim 16, wherein the submitting, the obtaining, and the implementing are performed during the execution of the process.

20. The computer-readable storage device system of claim 16, wherein CPU sampling is not enabled prior to conducting the designation-constrained tracing of the process, and CPU sampling is enabled during the conducting.

* * * * *